United States Patent
Lumelsky et al.

(10) Patent No.: US 6,463,454 B1
(45) Date of Patent: Oct. 8, 2002

(54) SYSTEM AND METHOD FOR INTEGRATED LOAD DISTRIBUTION AND RESOURCE MANAGEMENT ON INTERNET ENVIRONMENT

(75) Inventors: Leon L. Lumelsky, Stamford, CT (US); Nelson R. Manohar, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/335,272

(22) Filed: Jun. 17, 1999

(51) Int. Cl.[7] .............................................. G06F 13/14
(52) U.S. Cl. ...................... 709/105; 709/223; 709/226; 709/102
(58) Field of Search ................................ 709/105, 104, 709/102, 226, 221, 224, 223

(56) References Cited

U.S. PATENT DOCUMENTS

| | | | | |
|---|---|---|---|---|
| 5,802,301 A | * | 9/1998 | Dan et al. | 709/223 |
| 6,052,724 A | * | 4/2000 | Willie et al. | 709/223 |
| 6,167,427 A | * | 12/2000 | Rabinovich et al. | 709/201 |
| 6,223,206 B1 | * | 4/2001 | Dan et al. | 709/105 |
| 6,256,675 B1 | * | 7/2001 | Rabinovich | 709/241 |
| 6,324,580 B1 | * | 11/2001 | Jindal et al. | 709/228 |
| 6,324,590 B1 | * | 11/2001 | Jeffords et al. | 709/316 |
| 6,327,622 B1 | * | 12/2001 | Jindal et al. | 709/228 |

OTHER PUBLICATIONS

Nalini Venkatasubramanian et al.; Load Management in Distributed Video Servers; Proc. of the 17th Int'l Conf. on Distributed Computing Systems; pp. 528–535; May 1997.*

* cited by examiner

Primary Examiner—Kenneth R. Coulter
(74) Attorney, Agent, or Firm—Scully, Scott, Murphy & Presser; Douglas W. Cameron

(57) ABSTRACT

A system providing access to web objects that matches predicted demand for web objects to available capacity on web servers. The system implements methods to dynamically shape both demand and capacity based on certain criteria. The system provides methods to dynamically shape demand for an object based on criteria such as arrival time, incoming geography, and costs requirements. In particular, the present invention characterizes future demand for an object based on aggregation and forecasting of past demand for such object. The system effectively permits control and customization of capacity across one or more media servers based on characteristics associated with the demand across one or more of them, and particularly, based on the dominating geographical traits of past demand. Moreover, the system dynamically shapes capacity by: (a) controlling the number of replicas associated with an object; and, (b) controlling the placement of these replicas across servers in a distributed network. In particular, the system drives capacity shaping measures over a particular object based on its predicted demand. Consequently, the number and location of replicas associated with an object is made to be variable over time and driven by predicted demand for a web object.

44 Claims, 12 Drawing Sheets

666

| Object_ID | Replica | Server | Transient Replica | Time-to-Live |
|---|---|---|---|---|
| 420 | 421 | 1211 | NO | |
| | 422 | 1221 | YES | 060599-133000 |
| 440 | 441 | 1211 | NO | |

656

| Server | IP Address | Capacity Rating | Utilization State | Timestamp | Globality |
|---|---|---|---|---|---|
| 1211 | 209.09.9.127 | Low | Red | t1 | local |
| 1221 | 128.0.0.1 | High | Green | t2 | global |

| ObjectID | Demand rate req/s | Volume $t_{(i-1)}$ req | Volume $t_{(i-2)}$ req | Hot Object | Time Stamp |
|---|---|---|---|---|---|
| 420 | 10 | 120 | 60 | yes | $t_1$ |
| 425 | 5 | 60 | 55 | no | $t_1$ |
| 428 | 5 | 30 | 62 | no | $t_0$ |

SYSTEM AND METHOD FOR INTEGRATED LOAD DISTRIBUTION AND RESOURCE MANAGEMENT ON INTERNET ENVIRONMENT

BACKGROUND OF THE INVENTION

1. Field of the Invention

The present invention relates generally to techniques for monitoring, controlling, and distributing demand for resources in a widely distributed computer-networked environment, and, specifically, to a novel system and method for distributing load on web and multimedia servers and for managing and distributing resources across multiple web and multimedia servers.

2. Discussion of the Prior Art

FIG. 1 illustrates a typical distributed computer system (10) consisting of a plurality of clients (110, 111, 112), a plurality of servers (120, 121, 122), and several independent collections of objects (130, 131, 132). These components are connected by a computer networked environment (160) that enables a client (e.g., 111) to directly place a request message (140) for one or more objects from a server. The system allows such server (e.g., 121) to establish a streaming connection (150) for delivering an object to the requesting client (e.g., 111). This environment is typical of the Internet where a browser represents the client, a web server represents the server, a web site represents the collection of objects, the Internet represents the computernetworked environment. As known, the HTTP protocol provides the ability for a client to request an object from a given server via a location bound identifier referred to as a Universal Resource Locator (URL). The Transmission Control Protocol (TCP) provides the ability to stream an object (such as a web page or a video file) from the web server to the client.

FIG. 2 depicts in further detail the components of a server (e.g., 120) as found in the environment depicted in FIG. 1. The server contains a finite amount of local resources (200) comprised of memory (210), CPU (220), disk storage (230), and, network bandwidth (240). The server is associated with a collection of objects (130). In this particular case, the collection is composed of four objects (281, 282, 283, 284). Interactivity with a client such as VCR interactivity during playback (e.g., pause, rewind, stop, fast forward, etc.,), billing, security, etc. are handled by the server's service logic component (250). A signaling protocol (261) (e.g., HTTP) allows the server to receive requests (e.g., 140) from clients. For a client (e.g., 111) to access an object (e.g., 281) on the server's collections, the server allocates a portion of its resources (200) to the corresponding streaming connection (150). Because resources are finite, a local admission control process (260) is used to determine whether an incoming request can be served. A local resource management process (270) is used to reserve, access, monitor, and de-allocate local resources (200) in the server (for example, disk storage (HDD), bandwidth (B), CPU cycles (CPU), memory (MeM), etc. such as depicted in FIG. 2). The network streaming process (275) relies on a streaming protocol (271) to deliver content to its clients by establishing and managing streaming connections (e.g., 150) to clients. Management of resources at any particular server (e.g., 120) is completely independent from management of resources at any other particular server (e.g., 121). Furthermore, collections (e.g., 130 and 131) at different servers are independent from each other. In particular, though copies (281, 285) of the same object, e.g., object "O4" may exist on two different collections (130, 131) at different servers (120, 121) there exists no means of relating these copies (281, 285) to each other.

As depicted in FIG. 3, the distributed computer system 10 (of FIG. 1) may employ an object directory service 300 embodied as an object request broker (ORB) which provides the directory service over a collection of object sites (e.g., 130, 131, 132), and, extends location transparency to clients (e.g., 110, 111, 112) requesting objects (e.g., a media content file O4) from the distributed object collection (130, 131, 132). An object directory service (300) provides information necessary to locate any object throughout the computer-networked environment (160). The directory (310) employed particularly tracks the server associated with an object. For example, the first directory entry illustrates that object 281 is found on server 120 whereas the second directory entry illustrates that object 285 is found on server 121.

The task of leveraging the increased availability of widely distributed content and resources becomes very important with the proliferation of the next generation of the Internet, e.g., Internet2. The emerging Internet projects address the creation of a leading edge network for a new generation of applications that fully exploit the capabilities of broadband networks. Very high bandwidth and bandwidth reservation will allow materials such as continuous digital video and audio to move from research use to much broader use and include images, audio, and video in a way currently not possible. In such a widely distributed environment, accountable, efficient, and self-regulated management of resources will be desirable and most importantly, necessary.

The driving force behind the movement of Internet to the next generation is the commercialization of rich multimedia content. Digital library collections produced by corporations, entertainment material created by movie studios, and interactive instructional presentations developed by universities are soon to be available over the Internet, thus creating a new and broad source of revenue.

The emerging Internet relies on the bandwidth, which is on the order of several magnitudes larger than current Internet provides. It also alleviates network resource management and QoS control by introducing correspondent reservation and monitoring mechanisms. However, it is clear, that to date, mechanisms for the collective management of multiple media connections that efficiently leverage the sharing of resources across multiple servers in a wide area network are not found.

There is envisioned three major conditions for successful commercialization of those newly arising applications: first, mechanisms need be provided to allow paying users to establish a contract with service providers to reserve required infrastructure components and resources at a mutually agreed price for which providers establish and support a guaranteed quality of service; second, the resources supply would have to be sufficient to meet random changes of the demand, which may be completely unpredictable during architectural studies; and, third, service providers should safely rely on the system for effective security, rights and royalties management, accounting and billing for the consumption of dynamically re-configurable distributed virtual resources.

The current focus of resource management in the today's Internet, if any, relates to the setup and management of individual and independent media connections to server resources. However, the danger of this approach becomes clear when the presentations reuse multiple primary sources of content. To enforce the necessary quality as well as to control the usage and distribution when reusing multiple sources of content, two approaches are possible. One approach is to copy all content onto a single server (or a cluster of servers) during authoring, and replicating, as necessary, the final result to as many servers according to predicted demand. Primary content providers would then establish copyright charges, based on a-priori market analysis. On the positive side, the control of distribution, security, and billing functions become much easier, than in case of distributed content. On the negative, if the demand is estimated incorrectly, the profit is not maximized for either primary or secondary (i.e., reuse) content providers. Finally, the most dangerous problem is that this approach leads to over-engineering of resources while it does not prevent dropout of excessive requests. Such an approach is typical for today's Internet, because current multimedia content is generally not memory hungry, as compared with emerging multimedia applications.

Another approach would be to reassemble content on a need basis, for both authoring and dissemination. It would allow content to be stored once, but used as many times as necessary, establish charges proportionally to content and resources usage, and alleviate storage demand. However, it requires a system to dynamically manage multiple and frequently heterogeneous resources. In addition, this approach exacerbates security, and resource engineering. A demand for the particular segment can not be predicted at all, because this segment may be used in completely different, even orthogonal applications. Now, if the demand for a single segment can not be met, multiple applications are affected. The latter approach, however, is the only sensible way to be used by future Internet, because from the resource point of view, it is the most economical, and serving a maximum number of users.

Thus, it would be highly desirable to provide a system and method that allows all three major commercialization conditions to be satisfied.

There are a number of publications and patents in the area of QoS-driven resource management. Most of the work has been focused on either the network, as described in U.S. Pat. No. 5,388,097 issued Feb. 7, 1995 to Baugher, M. J. et al.,and entitled "System and Method for Bandwidth Reservation for Multimedia Traffic in Communication Networks," and U.S. Pat. No. 5,581,703 issued Dec. 3, 1996 to Baugher, M. J. et al, and entitled "Method and Apparatus for Reserving System Resources to assure Quality of Service"; or, the operating system, such as described in the reference "An Architecture Towards Efficient OS Support for Distributed Multimedia", Proceedings of IS&T/SPIE Multimedia Computing and Networking Conference '96, San Jose, Calif., January 1996 by David K. Y. Yau and Simon S. Lam. With the proliferation of multimedia services on Internet, it was soon realized that while IP networks were able to provide a simple, best-effort delivery service, the IP protocol is not suited for use with new real-time applications, such as multimedia streaming, Virtual Reality applications, distributed supercomputing. As a result, new network protocols, such as Resource Reservation Setup Protocol (RSVP) (See, e.g., "The Grid: Blueprint for a New Computing Infrastructure," Edited by Ian Foster and Carl Kesselman, Chapter 19, pp. 379–503, Morgan Kauffman Publishers, 1999); Real Time Transport Protocol (RTP); Real Time Transport Control Protocol (RTCP) and others, were developed (See, e.g., William Stallings, "High-Speed Networks: TCP/IP and ATM Design Principles", Prentice Hall, 1997; and, I. Busse, B. Deffner, and H. Schulzrinne, "Dynamic QoS Control of Multimedia Applications based on RTP", Computer Communications, January 1996), enabling applications to request and negotiate network QoS parameters, such as bandwidth and latency. Deployment of those protocols on the current Internet has not been successful, firstly because it required upgrading all the non-RSVP routers and servers system software. Secondly, even if RSVP were deployed on the current Internet, very limited bandwidth and computing resources would still have been the bottleneck for successful deployment of real-time applications. The current Internet was built on the backbone, enabling cross-country communications on relatively unclogged T3 (45 megabit per second). Proliferation of graphic pages, and streaming audio and video applications depleted those resources quite fast. Even worse, the rate of user's population growth is considerably higher than newly build network resources.

The National Science Foundation and MCI Corporation, responding to the emerging needs of Internet community has been building a new network, called vBNS (very-high-performance Backbone Network Service). This nationwide network also provides a backbone for the two foundations, university-led effort called Internet 2 and by federal research agencies, called New Generation Internet. The vBNS allows most of the connected institutions to run at 622 million bits per second (OC12). By the year 2000, vBNS is expected to operate at 2.4 gigabits per second (2,400 megabits per second) by the year 2000.

The vBNS system exploits RSVP protocol to support two distinct classes of services: a Reserved Bandwidth Service, i.e. a service with bandwidth commitment, and a traditional best-effort IP service (See, e.g., Chuck Song, Laura Cunningham and Rick Wilder, "Quality of Service Development in the vBNS", MCI Communications Corporation, provided at the URL http://www.vbns.net/presentations/papers/QoSDev/ieeeqos.htm. Still, resource management at the network layer for vBNS is done separately from operating system layer and in isolation from application needs and availability of the end-resources, such as storage and computing resources.

A new breed of high performance applications such as remote surgery, robotics, tele-instrumentation, automated crisis response, digital libraries of satellite data, distance learning via multimedia supported Web sites, enhanced audio, and video, is emerging. However, to accommodate such high performance applications and their continuous media flows, it is not enough to increase or reserve network capacity. These new applications require end-to-end resource reservation and admission control, followed by co-ordination of distributed functions such as: (a) resource scheduling (e.g., CPU, disk, etc.) at the end-system(s), (b) packet scheduling and flow control in the network, and (c) monitoring of the delivered end-to-end quality of service. It is essential that quality of service is configurable, predictable and maintainable system-wide, including the end-system devices, communications subsystem, and networks. Furthermore, all end-to-end elements of distributed systems architecture must work in unison to achieve the desired application level behavior.

Up do date, there has been considerable effort in the development of end-to-end quality of service support. Among them are Heidelberg QoS Model, developed within HeiProject at IBM's European Networking Center and described in the reference entitled "HeiRAT—Quality of Service Management for Distributed Multimedia Systems", Multimedia Systems Journal, 1996 by Volg, C., Wolf, L., Herrtwich, R. And H. Wittig; an Extended Integrated Reference Model (XRM), developed by COMET group at Columbia University such as described in the reference entitled "Building Open Programmable Multimedia Networks", Computer Communications Journal, Vol. 21, No. 8, pp. 758–770, June 1998 by Campbell, A. T., Lazar, A. A., Schulzinne, H. And R. Stadler; OMEGA end-point architecture, developed as the interdisciplinary research effort in the University of Pennsylvania such as described in the reference entitled "Design, Implementation and Experiences of the OMEGA End-Point Architecture", Technical Report (MS-CIS-95-22), University of Pennsylvania, May 1995 by Nahrstedt K. And J. Smith; in-serv Architecture which is a contribution of the Internet Engineering Task Force (IETF) such as described in the reference entitled "A Framework for End-to-End QoS Combining RSVP/Intserv and Differentiated Services," Internet Draft, IETF, March 1998 by Bernet Y, et al.; the Quality of Service Architecture QoS-A, developed by A. Campbell, and presenting an integrated framework dealing with end-to-end QoS requirements such as described in the reference entitled "A Quality of Service Architecture", PhD thesis, Lancaster University, January 1996 by Andrew T Campbell. Another reference which analyzes the above mentioned QoS paper is entitled "A Survey of QoS Architectures", ACM/Springer Verlag, Multimedia Systems Journal, Special Issue on QoS Architecture, Vol. 6, No. 3, pp. 138–151, May 1998 by Aurrecoechea, C., Campbell, A. T. and L. Hauw.

Substantial work has been done by SRI International, developing an End-to-End Resource Management of Distributed Systems (ERDoS), which enables adaptive, end-to-end, scalable resource management of distributed systems such as described in the reference ERDOS QoS Architecture, Technical Report, SRI International, May 1998. An extensible Resource Specification Language (RSL) and the resource management architecture has been implemented within Globus meta-computing toolkit, and used to implement a variety of different resource management strategies such as described in Czajkowski, K., et al., "A Resource Management Architecture for Metacomputing Systems" Proc. IPPS/SPDP '98 Workshop on Job Scheduling Strategies for Parallel Processing, 1998; and Foster, I., Kesselman, C., "The Globus Product: A Status Report" Proc. IPPS/SPDP '98 Heterogeneous Computing Workshop, pp. 4–18, 1998.

While the architectures described in the above-mentioned references are directed resource reservation and management of end-to-end resources, they generally assume a single, even geographically limited network subsystem which provides bounds on delay, errors and meet bandwidth demands, and an operating system which is capable of providing run time QoS guarantees. However, the next generation Internet must be viewed not as only a network of networks, but first and foremost a system of distributed systems. In this paradigm, not only the communication resources, but also the computing and storage servers are shared among many users.

Thus, the architectures mentioned above do not provide a coordinated management of overall system resources as a function of request activities for individual content and computing resources. It deals with resources pre-assigned to particular services. Consequently, quality of service must be degraded in response to growing volume of requests for such services over and above an established limit. As the above-mentioned architectures focus on providing QoS as requested by application, they do not take an advantage of a possible aggregation of resources due to commonality between user requests for a particular service.

For example, it would be desirable to determine commonality for the usage history of a particular multimedia content, e.g., bursts of requests within short time intervals, the proximity of origination addresses of requests, etc. In addition, the architectures described above do not allow for dynamic monitoring and recording of resource consumption for individual services as well as for groups of related services, with the purpose of calculating cost of service for individual clients.

Thus, it would be highly desirable to provide a mechanism capable of providing an adaptive resource management function for distributed resources that is suited for the next generation of Internet.

Moreover, it would be also desirable to provide a mechanism capable of integrating capacity-shaping mechanisms with the ability to manage and drive load distribution across collections of widely distributed media servers.

SUMMARY OF THE INVENTION

The present invention provides a system and method for managing multimedia content and resources that exploits the unique characteristics of future computer networked environments.

Particularly, it is an object of the invention to provide a system and method for managing and controlling the distribution, sharing and pooling of resources in an Internet/World Wide Web environment, that implements an intermediary control node between clients and servers for managing the distribution and placement of requests for multimedia objects onto servers as well as manages the placement of objects onto servers according to a set criteria.

It is a further object of the invention to provide a system and method for managing and controlling the distribution, sharing and pooling of resources in an Internet/World Wide Web environment, that includes matching predicted demand for (multimedia) web objects to available capacity on web servers and, dynamically shaping both demand and capacity by: (a) controlling the number of replicas associated with an object; and, (b) controlling the placement of these replicas.

Thus, according to the preferred embodiment, there is provided an autonomous self-regulated system providing integrated load distribution and resource management functions on a distributed computer environment. The system matches predicted demand to available capacity and in the pursuit of this objective, mechanisms are provided to shape demand and capacity according to certain criteria.

It is another object of the invention to provide a system and method for managing and controlling the distribution, sharing and pooling of resources capable of providing multimedia content in an Internet/World Wide Web environment, in such a manner that is beneficial, accountable, and seamless to the users.

According to the principles of the invention, an intermediary control node is provided between clients (e.g., web browsers) and servers (e.g., media/web servers) for managing the distribution and placement of requests onto servers as well as managing the placement of content onto servers. The controller acts as an intermediary that receives requests and formulates placements for these requests according to some set criteria. To do so, the controller explores, negotiates, and recommends placements of requests onto servers on behalf of a client.

The system relies on the controller for resource management of the distributed object collections across media/web servers. Within the context of the present invention, resource management is used to refer to the reservation, configuration, control, handling of exceptions, and release of resources needed to efficiently provision multimedia content to clients. Particularly, the controller attempts to match predicted aggregated demand for objects (across one or more servers) to available capacity on servers. To this end, the controller relies on a capacity shaping mechanism for dynamically controlling the placement and number of objects on servers. Further to this end, the present invention relies on two complementary notions: a global server for providing a spare, shared, and highly available capacity; and, a transient replica which models a multimedia object as a scalable and relocatable resource that responds to demand and capacity conditions. Together, they provide a system that may be used to assist a multimedia server by temporarily increasing the overall system capacity to match the predicted demand associated with a particular multimedia object. These complementary notions are additionally used to provide a system and method to dynamically control the placement and number of replicas on an Internet environment in response to constraints between demand and capacity. Thus, the system of the invention provides efficient methods to monitor demand and capacity and determine when to create and delete transient replicas from global servers. Particularly, on-demand replication is used as a tool to increase the likelihood of finding an available replica during the processing of subsequent requests for the same object.

It is important to note that the present invention achieves the above while preserving the autonomy of servers over the control of their resources. The resource management system is decentralized in that resource management controls (e.g., admission control, resource reservation, resource measurements, resource scheduling, etc.,) are implemented locally, at each server, and not centralized at the controller. Controllers do not directly manage servers and their resources. Instead, controllers represent agents that forward control recommendations to servers. This is achieved without imposing stringent monitoring requirements on the controller about the state of resources and servers on the system. Signaling protocols between servers and controller allow controllers to maintain resource management state during run-time in a fault tolerant way. The system tradeoffs signaling overhead against state maintenance overhead.

Advantageously, the present invention may be useful as a value-added service by a Internet Service Provider (ISP) supporting broadcast content providers (such as, for illustrative purposes only, a large News Network (NN)) to dynamically match demand to capacity of NN's servers. For example, when necessary, the ISP would place transient replicas (e.g., of NN content) on its own global servers based on characteristics about the demand for NN content as presented to the ISP.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figures 4, 6A, 6B:
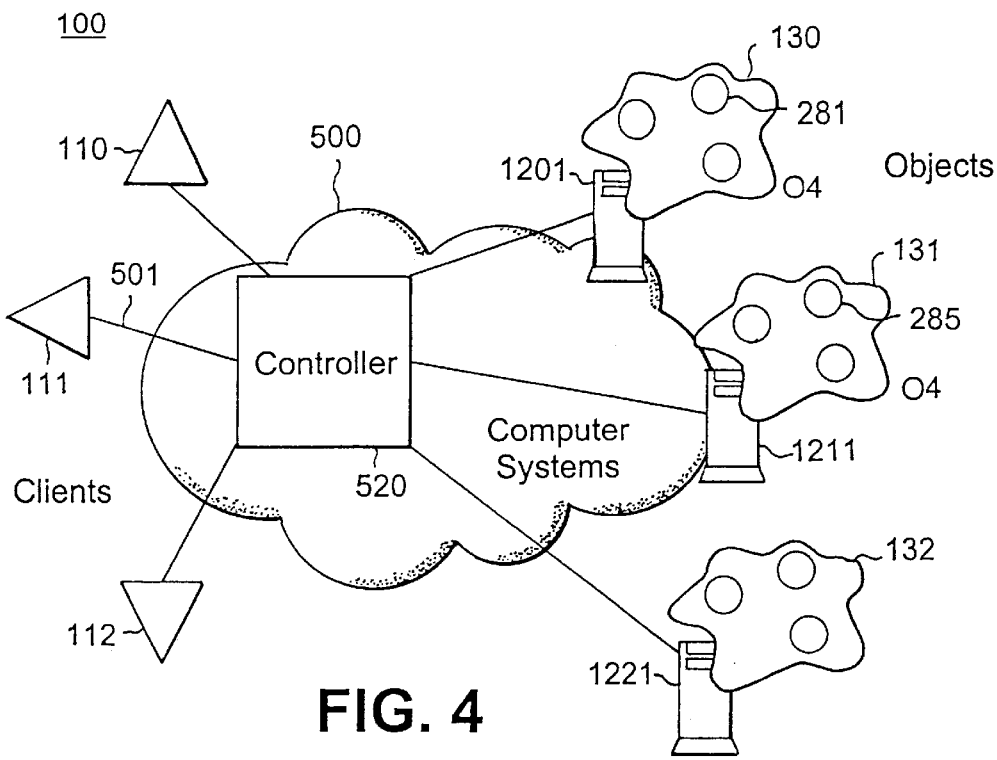
FIG. 4 illustrates a distributed computer system (100) according to the preferred embodiment of the invention that includes an intermediary controller device for handling requests from clients.
FIG. 6(a) illustrates an example replica directory (666) including schema and data associated with the replica directory.
FIG. 6(b) illustrates an example server directory (656) including schema and data associated with the server directory.

FIG. 4 illustrates a distributed computer system 100 according to the preferred embodiment of the invention comprising clients (110, 111, 112, etc.,), servers (1201, 1211, 1221), object collections (130, 131, 132), and object requests (500) from clients. As shown in FIG. 4, the distributed computer system additionally comprises an intermediary controller (520) for handling requests from clients. The controller (520) particularly places requests (e.g., 501) from a client (e.g., 111) onto a server (e.g., 1211) according to some set criteria as described in greater detail hereinbelow. For example, in the preferred embodiment the controller is used to introduce load balance and fault tolerance over the placement of client requests across the distributed object collections (130, 131, 132). Furthermore, as will be described in greater detail herein, the intermediary controller manages the placement of multimedia objects themselves onto servers according to some set criteria.

As will be explained in greater detail herein, implementation of the intermediary controller (520), and particularly, an object directory service, such as an ORB, enables characterization of the system 100 as a distributed collection of objects as opposed to a collection of servers. Thus, unlike the prior art system 10, the various collections of objects (130, 131, 132) found at each independent server (1201, 1211, 1221) aggregate now into a distributed collection (130, 131, 132) of objects and object replicas which model a multimedia object as a scalable and relocatable resource in accordance with demand and capacity conditions. For example, FIG. 4 shows object replicas (281, 285) associated with object O4 with one replica (281) found on the collection (130) on server (1201) and the other replica (285) found on the collection (131) on server (1211). As will be described in greater detail herein, servers may be considered as local which maintain persistent (object) replicas, or global, which maintain transient replicas. Global servers are dedicated for providing a spare, shared, and highly available capacity for maintaining replicated (transient) objects.

According to the invention, the temporal sequence of client requests presented to the controller (520) is referred to as the request stream or demand. Given a particular request for some multimedia object, the measure of the number of concurrent streams that may be made available by such a server given the available resources is herein referred to as the available capacity of a multimedia server. Furthermore, as understood by the controller (520), the measure of the number of streams (of a requested multimedia object) that may be supported across the overall system at a current time is also herein referred to as the available system capacity.

It should be noted that standards for controlling multimedia streaming data over the World Wide Web such as H.323 and Real Time Streaming Protocol (RTSP) are already in place and implemented to provide the streaming capabilities they are intended for. For example, whereas H.323 is designed for videoconferencing across small groups, RTSP is designed to efficiently broadcast audio-visual data to large groups. Each standard describes a client-server application-level protocol for controlling the delivery of data with real-time properties. For example, the RTSP establishes and controls either a single or several time-synchronized streams of continuous media, such as audio and video and uses transport protocols such as UDP, multicast UDP, TCP, and Real Time Protocol (RTP) to deliver the continuous streams.

Figure 5:
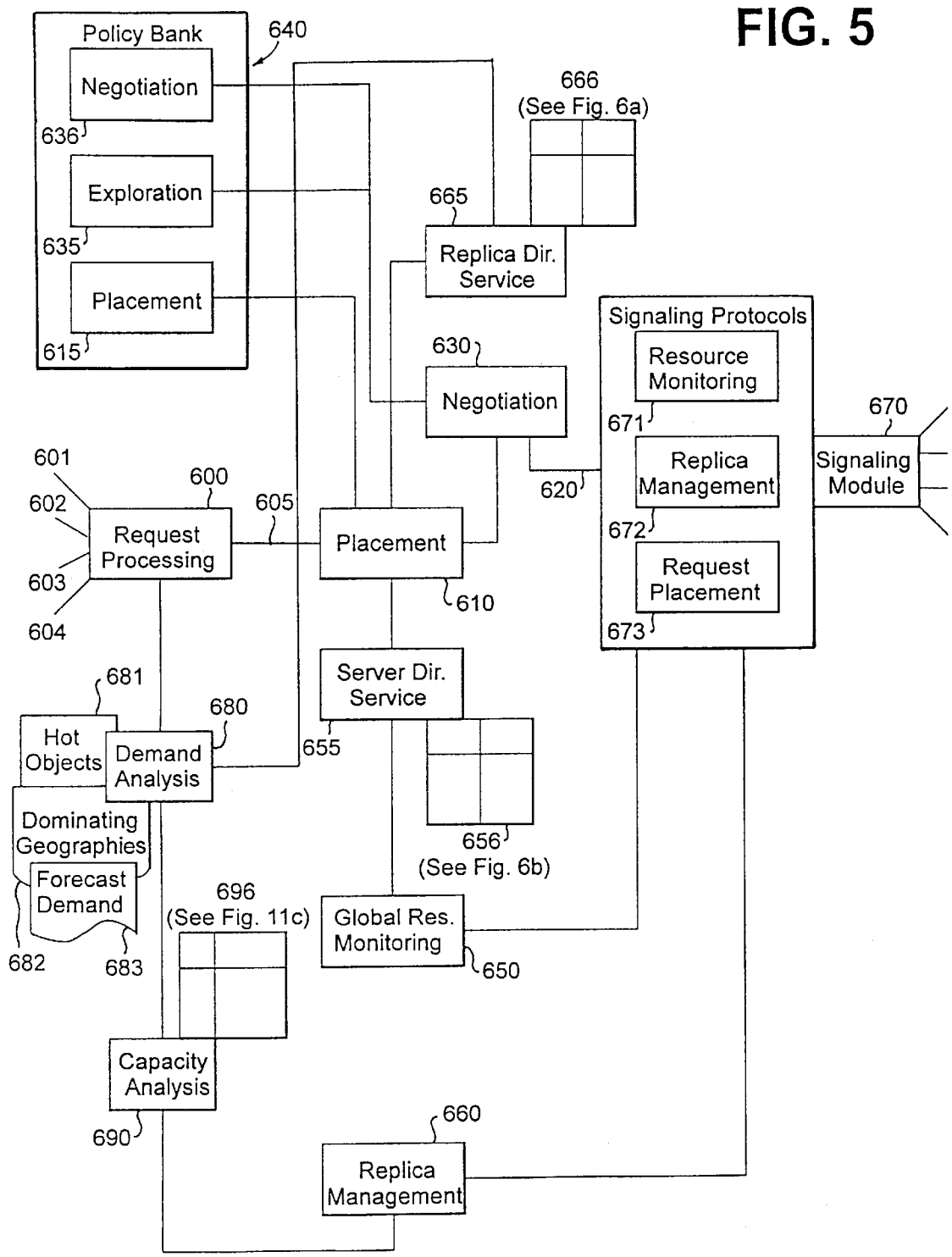
FIG. 5 illustrates a block diagram depicting the major components of the controller device.

FIG. 5 is a detailed block diagram of the intermediary controller device (520) implemented for managing the distribution and placement of requests (i.e., for multimedia objects) onto servers as well as to manage the placement of multimedia objects themselves onto servers. As shown in FIG. 5, a request processing module (600) is provided for receiving requests (601, 602, 603, 604) from clients, the requests including a unique object identifier, and feeding these requests to a placement module (610). The placement module (610) applies a placement policy (615) to each request and generates a set of tentative placement queries (620) for the request. Particularly, the placement module (610) interfaces with both a replica directory service (665) (for maintaining the replica directory (666) as described herein with respect to FIG. 6(*a*) and a server directory service (655) (for maintaining the server directory 656 as described herein with respect to FIG. 6(*b*) to generate the tentative placements. That is, the placement module (610), replica directory service (665), and replica directory (666) operate in conjunction to locate all replicas associated with the given object identifier of the received request. Further, the placement module (610), server directory service (655) and server directory (656) operate in conjunction to determine the willingness of any such location (holding a replica) to consider new placement inquiries (620), as will hereinafter be described.

FIG. 6(*a*) depicts an example replica directory (666) maintained by the replica directory service (665) and including schema and data associated with a replica directory implemented by the system 100 of the invention. An object identifier (e.g., 420) is assigned to each different object (e.g., O4, etc.) in the distributed collection for uniquely identifying an object throughout the distributed collection. According to the invention, original client requests may be preprocessed by an auxiliary system (not shown) capable of transforming an ambiguous request from a client into a uniquely identifiable object identifier. For each object identifier, one or more replicas may exist throughout the distributed collection. For example, in FIG. 6(*a*) there is illustrated the case of two different object identifiers (420, 440). Whereas the first object identifier (420) is currently associated with two replicas (421, 422), the second object identifier (440) is associated with only one replica (441). Replicas for the same object identifier are distributed across different servers. For example, the replicas (e.g., 421, 422) of object identifier (420) reside on different servers (1211, 1221), respectively. Additionally associated with each object replica is a time-to-live timestamp which indicates the degree of transiency of the replica. As will be described in greater detail herein, when the time-to-live deadline has expired, a request to prolong the object replica's existence at the global server is initiated.

As the replica directory (666) needs to be resilient to failures, data about persistent replicas and their associated local servers may be safely checkpointed without substantial risk of loss of data. However, only data about transient replicas is volatile. To recover from a loss of data about transient replicas, the controller (520) simply queries global servers for a list of currently unexpired transient replicas. It should be noted that the above-mentioned server directory (656) (FIG. 6(*b*)) enables the controller to find out the identity of all global servers. By querying each global server in the controller's domain, the controller may re-populate the replica directory on demand. It should be noted that the list of global servers may be checkpointed as well to avoid risk of loss of data. A skilled artisan will appreciate that replicas unaccounted for after the re-population of the replica directory (666) will observe increasingly less utilization as no further requests will be placed onto this particular global server by this controller.

FIG. 6(*b*) depicts an example server directory (656) maintained by the server directory service (665) and including schema and data associated with the server directory. A server identifier (e.g., 1211) is assigned to each different server in the distributed computer environment (160). The server identifier is assumed to be fixed and not to be changed. Examples of possible server identifiers are the server's fixed IP address or hostname (e.g., Name1 (1211) and Name2 (1221)). For each server identifier, a special field referred to as the server's capacity rating is used to rate the overall capacity of the server. That is, the capacity rating is used by the controller to differentiate between servers having substantially different resources. In the preferred embodiment, a two-tier rating is used. The preferred embodiment differentiates between two capacity ratings: HIGH (e.g., supercomputer/mainframe) and LOW (e.g., an NT-class server), however, a skilled artisan will appreciate that possibly other different rating schemes could be used instead. The capacity rating is an inherent parameter of a server and it is set during initialization. For example, a default rating for a server may be a LOW capacity. According to the invention, the capacity rating allows the controller to differentiate between high and low capacity servers without requiring the controller to track the actual available capacity on a server. Global servers for maintaining replicated (transient) objects receiving are typically HIGH capacity servers.

Additionally, for each server identifier, a special field is used to store the last reported utilization/willingness state for that server (for example, server (1211) is RED whereas server (1221) is GREEN. In addition, for each server, the time of its last utilization/willingness state report received by the controller is also stored. For example, in FIG. 4(*b*), server (1211) has associated timestamp t1 whereas server (1221) has associated timestamp t2. Last, a field indicates whether the server is a global server or a local server. For example, the server (1211) is known by the controller to be a local server whereas the server (1221) is known to be a global server. It should be understood that a server can be both global and local, in such case, two different entries would be used. One entry would describe the virtual local server and another would describe the virtual global server.

Referring back to FIG. 5, the controller (520) further includes a negotiator module (630) provided for choosing one or more tentative placements (620) and executing a query strategy to query the servers associated with those tentative placements. The resulting query strategy is produced according to an exploration policy (635) and a negotiation policy (636). The negotiation policy is implemented to refine multiple tentative placements and enable choosing based on some criteria such as cost. A policy bank (640) is used to store and load the various policies (e.g., 615, 635, 636) and allows customization of the controller algorithms as described herein. It should be understood that these policies may either be loaded during initialization or on-demand.

As further illustrated in FIG. 5, the controller (520) is further provided with a global resource monitoring module (650) for monitoring the servers. Resource monitoring data is provided by the server directory service (655). A replication management module (660) is provided for applying heuristics to manage the lifecycle of a replica, and particularly determine whether a replica ought to be created, destroyed, or moved. Replica data is provided by the replica directory service (665). A control signaling module (670) provides an interface to servers via three signaling protocols: a resource management protocol (671), replica management protocol (672), and placement management protocol (673). According to the invention, the placement module (610) operates in conjunction with the placement management interface (673) to compose and forward the placement inquiries (620), according to a placement (615) or exploration policy (635), to one or more of such willing and capable locations. A placement inquiry that successfully passes admission controls on a server is referred to as a candidate admission. A candidate admission is unlike the traditional notion of a guaranteed admission in that resources are only tentatively reserved by the server for only some relatively short duration (i.e., in the order of several seconds) after which is the candidate admission has not been secured by the server it is dropped. As will be further explained herein in greater detail, the negotiation module (630), negotiation policy module (636) and placement management interface module (673) operate in conjunction to: choose and secure a candidate admission into a guaranteed admission from among a set of positively acknowledged candidate admissions; to invalidate all other candidate admissions for servers other than from the server previously chosen; and, invalidate all other pending placement inquiries.

Further provided as part of the controller device (520) is a demand analysis module (680) for examining the stream of requests (605) and generating a list of the most requested objects (681), hereinafter referred to as "Hot Objects", the most dominating geographies (682) for these objects, and, forecasts about their demand (683). These statistics are fed to the replica management module (660). A capacity analysis module (690) examines available capacity for each of the most requested objects and feeds available capacity to the replication management module (660).

As further shown in FIG. 5, the system of the invention relies on three interfaces to relay control information between the controller (520) and the servers: a resource management (671) interface, a replica management (672) interface, and a placement management interface (673). A skilled artisan will appreciate that there exists several protocol standards that may be used to facilitate the implementation of these interfaces. For example, the resource management protocol may be implemented by building on functionality provided by RSVP and RTSP. On one hand, the Reservation Protocol (RSVP) is a resource reservation setup protocol designed for an integrated services internetwork. An application invokes RSVP to request a specific end-to-end QoS for a data stream. RSVP aims to efficiently set up guaranteed QoS resource reservations which will support unicast and multicast routing protocols and scale well for large multicast delivery groups. The RSVP protocol would be used, as expected, to provide end-to-end resource reservation from a multimedia server to its client(s) on a per-connection basis. On the other hand, RTCP is a measurements and control protocol that works in conjunction with RTP. RTCP control packets are periodically transmitted by each participant in an RTP session to all other participants. Feedback of an application-level information may be used to control performance and for diagnostic purposes as required by the present invention. The RTCP protocol would be used to feed back measurements (i.e., the resource management protocol MON_STATUS and MON_REQUEST messages) between a multimedia server and its controller. Whereas RSVP provides a mechanism to implement quality of service negotiation between distributed parties, RTCP provides a mechanism to relay measurements and performance feedback information between distributed parties. Similarly, the replica management protocol could be built of abstractions provided by the Internet file transfer (FTP) and the RSVP protocols. Whereas FTP permits the movement of content at the best possible effort in a pipe between servers, the RSVP permits the specification of the pipe in an integrated services network.

As mentioned, the system of the invention provides integrated load distribution and resource management functions on a distributed computer environment by attempting to match predicted demand to available capacity and, in the pursuit of this objective, shape demand and capacity according to certain criteria. These functions will now be explained in greater detail herein.

Request Management System

As described with respect to FIGS. 4 and 5, the present invention enables the placement of a request (e.g., 601), given a unique object identifier, onto a server (e.g., 1211) having a replica of the requested object, via an intermediary controller device (520). According to the preferred embodiment of the invention, the controller device implements several mechanisms to dynamically reshape demand according to immediate capacity: 1) in a first approach, requests may be upgraded or downgraded according to the needs of the controller and the parameters of the request. In particular, the controller may explore placement options for a request based on slightly dissimilar parameter values to those found in the original request; 2) in a second approach, similar requests having temporal proximity may be delayed and grouped according to the needs of the controller and the particular constraints of each individual request. In particular, over some arbitrary time interval, the controller may buffer, re-organize, and batch a group of similar requests to a global (multimedia) server with multicast capability, for example; and 3) in another approach, requests sharing similar geographical characteristics may be grouped according to the needs of the controller and the availability of more cost-efficient resources in a geographical area. In particular, the controller may associate clients as well as servers with a geographical constraint such as timezone (e.g., EST) or available bandwidth (e.g., T1-line) to then bias the placement of requests based on these criteria.

To this end, the controller functions as a statistics gathering point. In particular, two types of statistics—demand statistics and capacity statistics—are maintained by the controller. On one hand, demand statistics are used by the controller (520) to describe characteristics about the past requests. In the preferred embodiment, predicted demand statistics are generated by the controller by analyzing the aggregated request stream from different clients as observed by that particular controller. For example, statistics are generated to characterize the density of the demand, the volume of the demand, and the dominating geography associated with the demand. On the other hand, capacity statistics are used by the controller to describe characteristics about the capacity of multimedia servers to accept placements for multimedia objects. In the preferred embodiment, available capacity is loosely estimated by servers and forwarded to the controller (520) as deemed necessary by a server.

Figure 10:
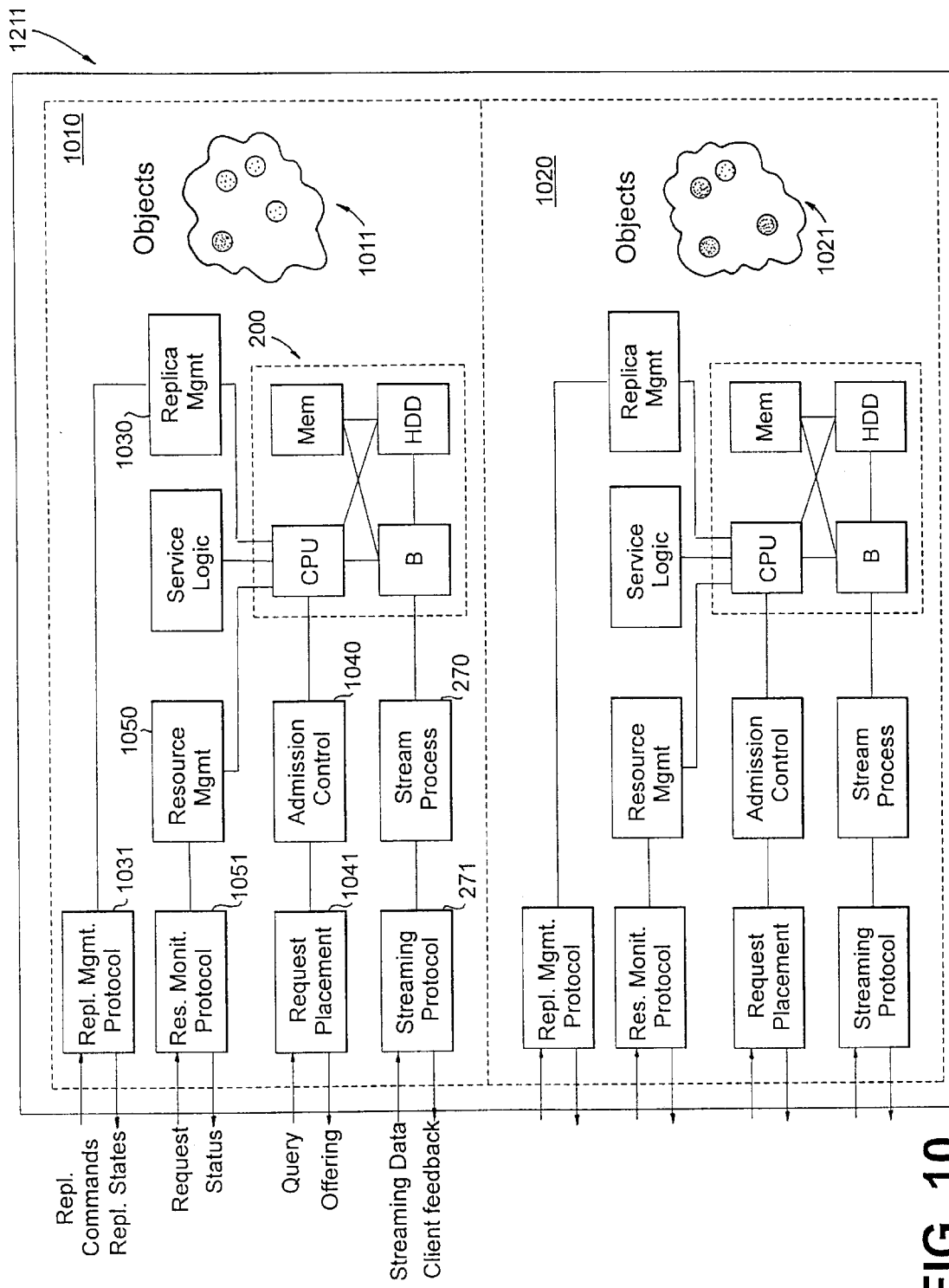
FIG. 10 illustrates in further detail the modification of a server device according to the invention.

According to the preferred embodiment of the invention, the system is decentralized in that admission controls are implemented locally at each server. FIG. 10 is a detailed illustration of the global server 1211 in FIG. 4. As shown in FIG. 10, each server (e.g., server 1211) is provided with an admission control mechanism (1040, 1041) enabling a server to grant or deny a candidate admission to a placement inquiry (query) request and acknowledge this back to the controller (offering). The admission control mechanism (1040, 1041) further functions to promote a candidate admission into a guaranteed admission, and, to invalidate a candidate admission. The controller device (520) does not perform any admission nor resource reservation tasks. A skilled artisan will appreciate that the invention is applicable to a collection of servers as well as server clusters. In particular, because a centralized admission controls is associated with each server cluster, each such cluster would appear to the controller as a single server of HIGH capacity. Consequently, the controller does not make any particular differentiation between a server and a server cluster.

Preferably, the controller has several degrees of freedom in matching demand to capacity. First, it controls and shapes the distribution and placement of requests onto servers. Second, it controls and shapes the distribution and placement of replicas across servers according to some set criteria. Last, the controller is capable of dynamically creating, destroying, and moving replicas across servers as deemed necessary by the mechanisms of the present invention in order to achieve its goals.

Figure 7:
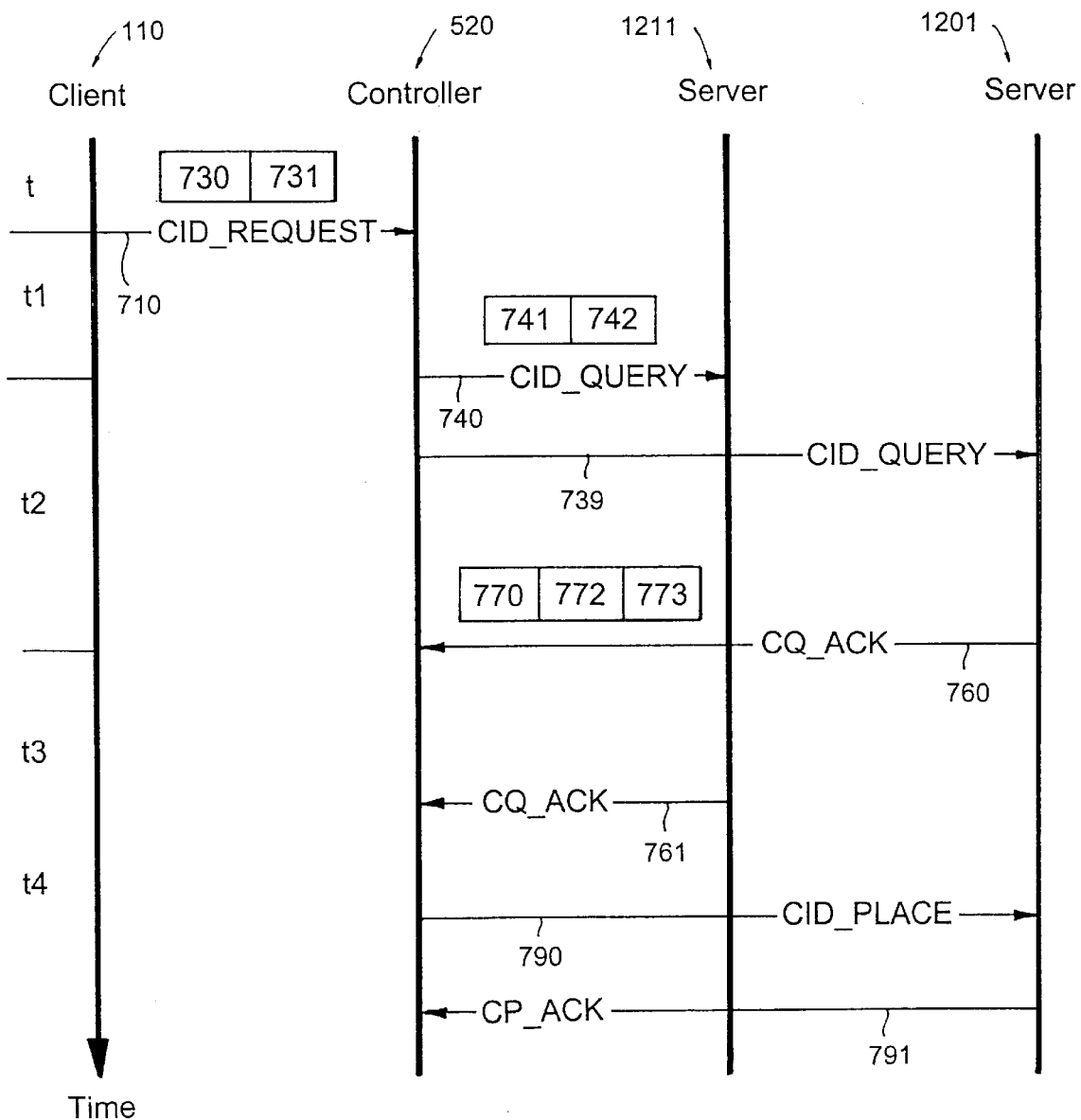
FIG. 7 illustrates, via an example, a timeline diagram for the placement management protocol.

A signaling protocol between controllers, clients, and servers, herein referred to as the placement management protocol, shown and described in greater detail with respect to FIG. 7, is used between these distributed parties to allow the controller (520) to place a client request onto a server. The protocol comprises the implementation of at least the following messages: a CID_REQUEST message used by the client to submit a request to the controller; CID_QUERY, message used by the controller to explore candidate placements across servers; and CID_PLACE message used by the controller to request the promotion of a candidate admission into a guaranteed admission. In addition, each of these messages is associated with an acknowledgment message CX_ACK which message is used by a signaling party to respond to any of the above asynchronous messages: CID_REQUEST, CID_QUERY, and CID_PLACE. Thus, for a CID_QUERY message, the CQ_ACK message returns a positive acknowledge indicating that a candidate admission has been granted. The message indicates the expiration deadline of the admission. A skilled artisan should appreciate that this expiration deadline may be configured on a per-server basis to differentiate the aggressiveness of a server in pursuing a new placement. Furthermore, in some embodiments, it may be possible to make this deadline variable over time based on the available capacity of the server. For a CID_PLACE message, the CP_ACK message relays a flag indicating whether or not the candidate admission has been promoted into a guaranteed admission.

In general, the process of mapping a request onto a server is decomposed into three stages by the controller. First, the controller proceeds to identify one or more servers, if any, from those servers that contain a replica of the requested object that are known to be willing to consider admission queries. Second, the controller proceeds to query one or more of these servers with an admission query under some selected parameters possibly provided to the controller in the CID_REQUEST message. In the present invention, this process may iterate until an agreement is negotiated between server and controller with possibly the intervention of the client. Last, the controller proceeds to place the request into one of the servers found to be capable in the last step. As the former two stages may be iterated before the later stage is entered, then, according to the present invention, the mapping of a request onto a server is an iterative process including exploration and negotiation across a dynamic set of feasible candidate admissions.

Means for tracking the location of each replica is provided using the controller's replica directory service (665). Given a unique object identifier, a lookup to the replica directory (666) returns the location of all corresponding replicas on the system. In the preferred embodiment, the location of a replica is represented as just a server address (such as a hostname or an IP address). It should be noted that just one replica per server is sufficient.

FIG. 7 illustrates a timeline diagram for the placement management protocol. As shown in FIG. 7, at time t, the controller device (520) receives a CID_REQUEST message (710) from the client, e.g., 110. At time t1, the controller (520) sends CID_QUERY messages (739,740) to two servers (1201, 1211, respectively) known to be willing to consider admission queries. Each CID_QUERY message contains the unique identifier (741) of the object being requested in addition to other parameters (742) such as the resolution, quality, cost, and/or maximum delay in the form of name-value pairs. These parameters (742) may correspond to the parameters (731) specified by the client in the CID_

REQUEST message (710) or a refinement of these. These parameters (742) may be negotiated with each server (1201, 1211) independently according to the negotiation policy (636) associated with this particular request.

At time t2, the server (750) responds to the controller (720) via the CQ_ACK message (760). This message contains a flag (770) indicating whether a candidate admission has been granted by the server (1201). The message also contains the expiration deadline (772) of the candidate admission and negotiated name-value pairs, if any, for the corresponding CID_QUERY message parameters (773) that this particular server (e.g., 1201) is willing to provision with the candidate admission.

Similarly, the timeline depicts at time t3 that the second server (1211) responds to the controller (520) via another CQ_ACK message (761). When a CQACK message indicates that a candidate admission is being held by a server, the parameter fields of the CQ_ACK message (e.g., (773)) describe the specific parameter values that the corresponding server is willing to provide. The controller waits for one or more CQ_ACK (760, 761) within reasonable time, e.g. on the order of seconds. Then, based on its negotiation policy (636), the controller (520) may choose one (say, 760) of the CQ_ACK responses received so far (760, 761).

It is also possible that no candidate admission could be secured. This may be due to several reasons such as: (a) lack of resources at all of the servers, (b) lack of agreement on the negotiation parameters, (c) expiration of the negotiation deadline, or (d) a combination of the above. Preferably, a negotiation deadline is provided to enforce fairness across all requests. This way the controller does not overspend time in needless searches for unfeasible requests at the expense of other requests. Clearly, the negotiation deadline should be a system parameter. In particular, because of the distances between servers and objects, this deadline ought to be in the order of tens of seconds. In any case, the controller refers to the negotiation policy (636) associated with this specific request to decide what the proper treatment for this condition should be. Several possible treatments may be applied such as to request a new set of parameters (731) or to re-evaluate the exploration policy (635) for seeking candidate admissions and then reissuing CID_QUERY messages to servers in this new set.

The timeline depicts at time t4 that the controller (520) to send a CID_PLACE message (790) to the server (520). This message contains the unique identifier (730) and causes the server to upgrade the candidate admission into a guaranteed admission. The server acknowledges this upgrade via the CP_ACK message (791). Referring back to FIG. 5, each placement recommendation (620) is associated with a mapping (also known as placement) policy (615). For example, once such placement/mapping policy (615) could be specified as: "always place requests onto GREEN replicas on servers of LARGE capacity". Once a candidate admission associated with a placement is chosen by the controller, the placement becomes guaranteed by the controller. To this end, the controller secures a guaranteed admission for the placement and polices the placement. The terms of such guarantee are specified by the placement policy of the controller (e.g., "always place requests onto GREEN replicas, prefer HIGH capacity servers, and make such placements tolerant to server failures"). Consequently, the performance of such binding is monitored by the controller during its lifetime. Furthermore, during the lifetime of a binding, conditions may arise that may jeopardize the performance of the binding. For example, typical user non-linear interactivity (e.g., VCR stop, rewind, pause, continue) may jeopardize a binding created under a linear playback model assumption as that enforced by typical Video on Demand (VoD) servers. Similarly, server failures would typically abort a binding. Depending on the placement policy selected by the controller, the controller may guarantee the performance of such binding regardless of whether such conditions arise. For example, for a binding with a fault tolerant guarantee, if the server drops the binding, the controller will attempt to autonomously seek a new placement and resume progress there.

Further with respect to FIG. 5, it is an aspect of the invention that instead of exploring each possible placement recommendation independently, the controller may explore multiple placement recommendations (620) at the same time. This behavior is specified to the controller via an exploration policy (635). For example, one such an exploration policy could be specified to be as: "iterate at most k times and under each iteration explore placements across at least 1 but no more than m servers". The exploration policy can be expensive for requests that turn out to be unsuccessful. For example, under such policy a total of at least N=k·l protocol negotiations of at least two (2) messages each were started for every unsuccessful request. The present invention allows each request to be associated to an exploration policy. Clearly, such simultaneous exploration of servers and replicas may result in the same request being mapped onto different servers. It should be also noted that given a specific request, the controller might produce zero or more placement recommendations. For example, when available capacity is insufficient to meet a request, no placement recommendation is produced.

Referring back to FIG. 7, it should be understood that pending CID_QUERY messages may be abandoned by the controller. For example, in the present invention, the controller simply abandons placement queries that are no longer of interest to it (for example, if the responses of queries exceed a maximum waiting time threshold). The configuration of this negotiation is specified by the negotiation policy (636) to the controller (FIG. 5). For example, one such negotiation policy could be specified as: "negotiate a set of parameters x with the server such that the cost difference between these parameters y and the original parameters x (731) is at most z".

Aggregation-Driven Response

As mentioned, the system of the present invention intends to match server capacity to predicted demand. To this end, the invention implements the controller (520) for resource management by monitoring demand and monitoring capacity in the distributed computer system. Particularly, the controller attempts to match predicted aggregated demand for replicas to available capacity on servers and placement of replicas on servers. Predicted demand statistics are generated by analyzing the stream of requests from different clients. Available capacity is estimated by monitoring and querying servers.

The controller (520) stores persistent and dynamic state and data about objects, replicas, servers, requests, and their placements. For example, in the preferred embodiment, directory services are used to store data about the demand for a particular object, the location of its replicas, the capacity of a given server, and the time distribution of requests. It is understood that, in the preferred embodiment, these data structures are rendered resilient to loss of data as well as data corruption, as previously discussed.

The selection of which objects are valid replication candidates (herein referred to as "hot objects") is made according to criteria such as the predicted demand for an object identifier. In the preferred embodiment, the selection of replication candidates is driven by an online analysis of aggregated predicted demand against available capacity. That is, replica management attempts to match predicted demand to available capacity subject to geographical proximity.

To this end, the system of the invention aggregates requests into groups of requests having similar characteristics. For example, requests received during some bounded time interval from independent clients may be managed as a group for placement purposes by control servers according to some set criteria. Examples of criteria for relating requests include, but are not limited to: 1) geographical proximity of clients requesting the same object identifier; 2) commonality on requested constraints such as resolution and quality; and, 3) temporal proximity in the arrival time of requests for the same object identifier.

According to the invention, any particular request may be autonomously upgraded or downgraded by its controller in order to pool slightly dissimilar requests for the same object identifier into similar requests. This may be achieved, for example, by decreasing the sensitivity of the geographical proximity grouping criteria, decreasing the quality of the requested object, decreasing the sensitivity of the temporal proximity grouping criteria, or some combination of the above. Controllers may exercise this option or not based on client, request, and/or object characteristics such as cost preferences. It should also be noted that, however, the controller may decide to handle requests for the same object identifier in a manner that could be non-correlated with respect to other requests.

Figure 11A:
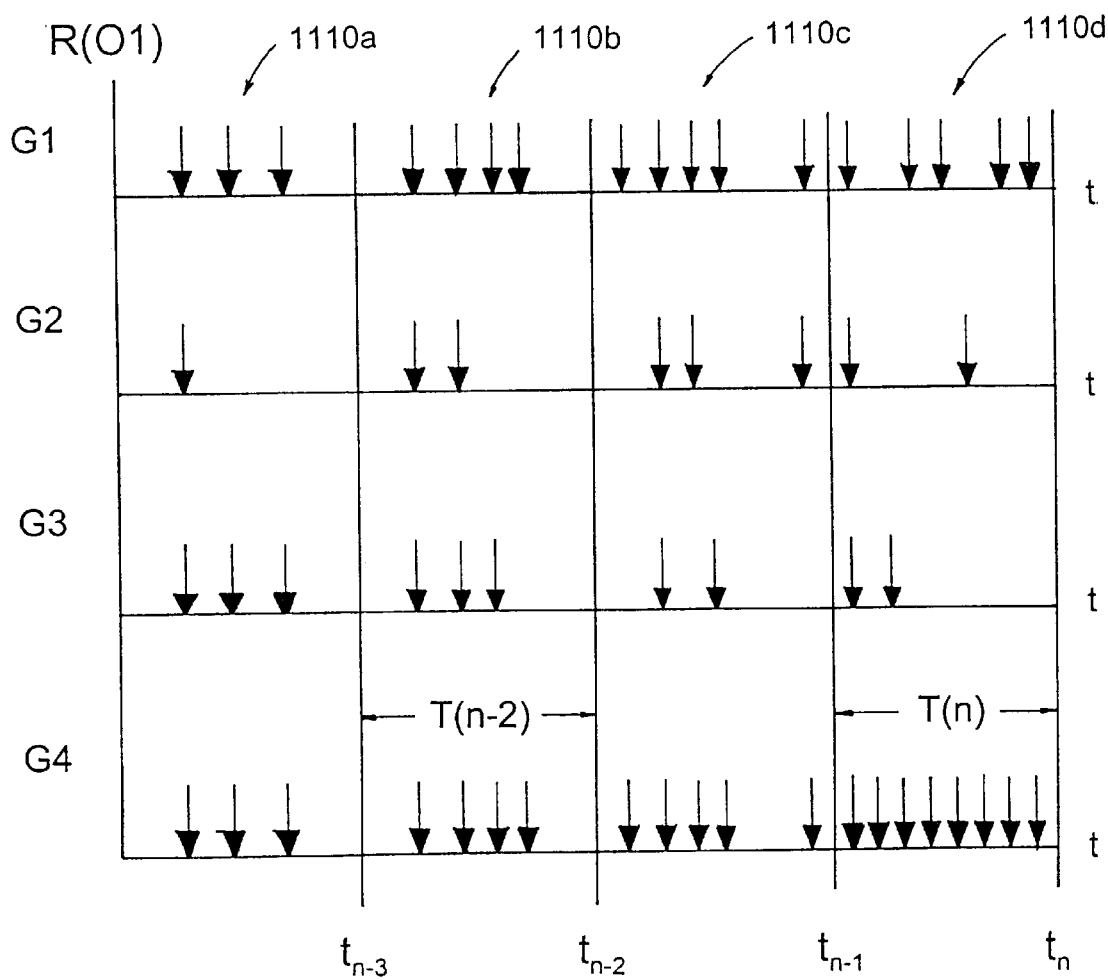
FIG. 11(a) illustrates a stream of requests as observed by a controller and the use of bounded time intervals for the generation of demand statistics.

As mentioned, the controller device monitors the distribution of requests over time. In the preferred embodiment, statistics are maintained about the distribution of requests for each particular object identifier. Demand statistics provide information about the relative demand for an object identifier and enable the ranking of object identifiers in terms of demand. In particular, statistics characterized for each object include: 1) the density of the demand; 2) the volume of the demand; and, 3) the dominating geography associated with the demand. The controller maintains demand statistics for each object on the distributed collection. Demand statistics for a particular object are updated on each request for such object. In particular, the controller flags objects found to be in high demand (i.e., hot objects). The computation of demand statistics performed in the demand analysis module (680) of FIG. 5 for a particular object O1 is illustrated in FIGS. 11(*a*) through 11(*c*). A skilled artisan should appreciate that there exist many ways of computing these statistics in order to increase the confidence and accuracy of its estimates.

Figure 8:
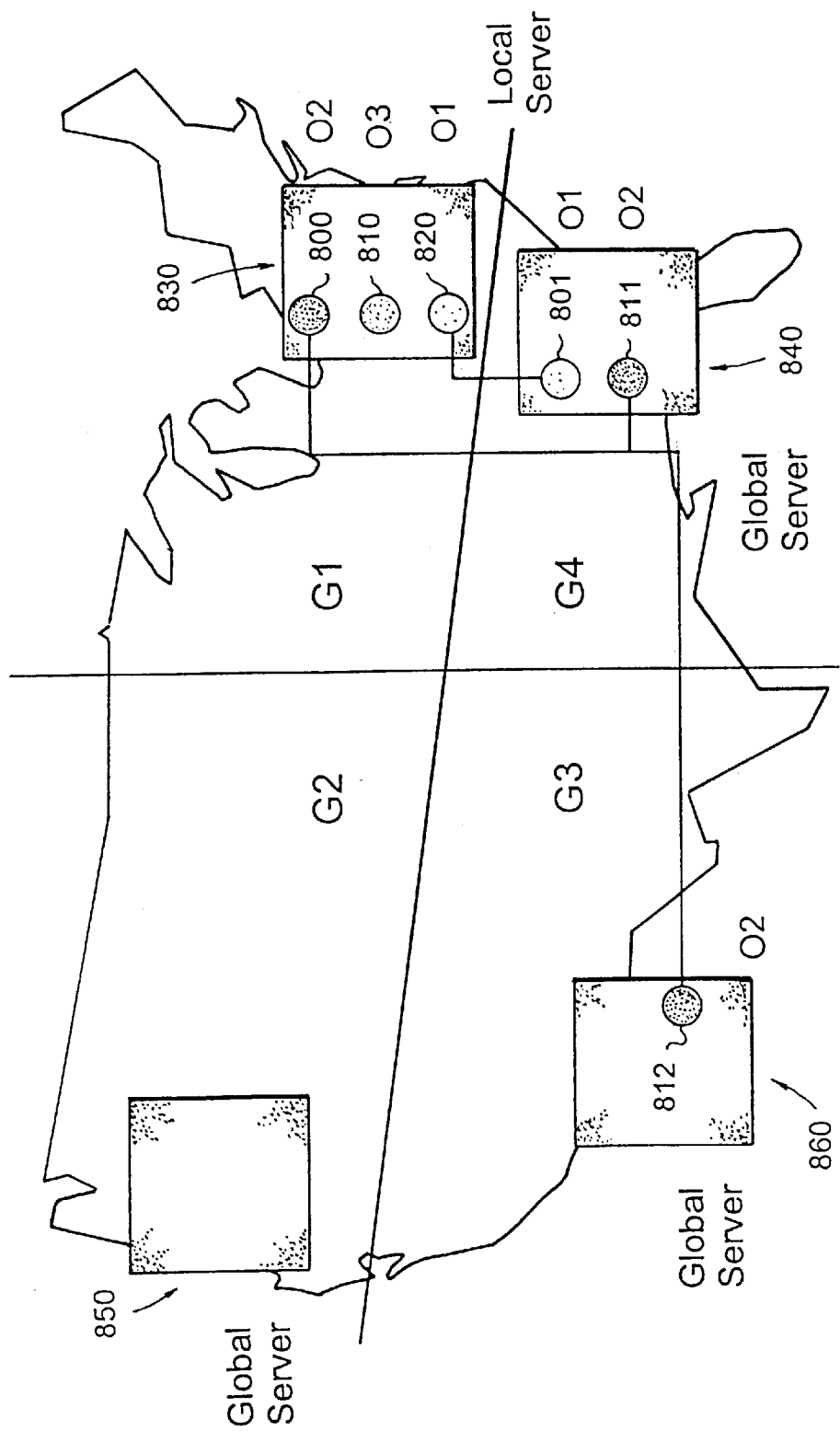
FIG. 8 illustrates a distributed computer system for dynamically controlling the placement of replicas onto global servers where demand and geographic trends are used to motivate the differentiation between persistent and transient replicas.

FIG. 11(*a*) illustrates a stream of requests (1110*a*, ..., 1110*d*) across respective time intervals $t_{n-3}, t_{n-2}, t_{n-1}, t$ as observed by a controller. Each request is associated with an object identifier and a geography indicator G1, G2, G3, or G4 that is used to uniquely identify the geography partition associated with a requesting client, for example, as shown in FIG. 8. In the preferred embodiment, geography partitions are set a-priori by the administration of the system. For instance, FIG. 8 illustrates a distributed computer system for dynamically controlling the placement of replicas O1, O2 and O3 onto various global servers 830, 840, 850, 860 where demand and geographic trends are used to motivate the differentiation between persistent and transient replicas. Transient replicas always reside on one or more global servers and have a dynamic lifetime as determined by the controller. Controllers manage the dynamic placement of replicas onto global servers in response to some set criteria such as cost, demand, and capacity, as will be explained. It is understood that the geographic partitions G1, G2, G3, or G4 are formulated a-priori by the system administrators to match known geographic regions such as the Eastern Standard Zone or the Pacific Standard Zone or NorthEast and SouthWest USA. However, geographic partitions may be set dynamically by the controller. For example, the controller could group clients having attributes or characteristics and use this criteria to aid in the placement of such similar requests.

Returning to FIG. 11(*a*), there is illustrated the generation of a request density statistic for each object identifier in the request stream for object O1. The example depicted in FIG. 11(*a*) illustrates the computation of the statistic during four intervals (for example, T(n−2) (1110*a*) and T(n) (1110*d*)). The density demand statistic is computed as the number of requests per bounded time interval T(j). This example shows the demand statistic to change from 10/T during the first interval to 13/T on the second interval, to 15/T in the third interval, to 16/T in the last interval shown. It should be noted that demand statistics may be smoothed before being used by the controller so as to increase their robustness.

FIG. 11(*b*) additionally illustrates the computation of the dominating geography statistic corresponding to FIG. 11(*a*). In this example, the system is divided into the four geography partitions (G1, G2, G3, G4) which are known a-priori. Requests are tagged with their incoming geography before being analyzed by the controller. During each interval T(j), for each incoming request for a given object, the controller sorts these requests by geography partition and updates a request counter (not shown) associated with each geography partition. The example shows that geography partition G4 steadily becomes the dominating geography over geography partitions G1, G2, and G3 during the four intervals shown. Again, it should be noted that the dominating geography indicator may be smoothed before being used by the controller so as to increase its robustness.

FIG. 11 (*c*) depicts a further example of the schema and data structure (696) used to store the demand statistics maintained for each replica. For each object identifier, the controller stores statistics about its predicted demand. In accordance to current practices in forecasting and smoothing, moving window statistics are used. A time interval (herein referred to as T) is used to smooth demand statistics. A moving window of size K*T is used to forecast demand statistics. The type of smoothing technique used (e.g., exponential smoothed or uniform smoother) and the desired robustness or confidence on the smoother determines the number of intervals to smooth (K). The size of the time interval used for updating demand statistics should be sufficiently large, as this is needed to: (a) reduce overheads, (b) smooth transient effects, and (c) span a sufficiently large number of requests. On the other hand, the smaller values of T and K allow the controller to react more rapidly to changes on demand. Reasonable values in current practice for the internet domain are the use of an exponential smoother with K=2 and T=[60, ..., 3600] seconds. Thus, in an example data structure shown in FIG. 11(*c*), a request density statistic (1150) describes the density of requests associated with its corresponding object identifier as observed by this particular controller during the last few K time intervals T (i.e., j, j−1, ..., j−k+1). The dominating geography indicator (1160) describes the dominating geography associated with its corresponding object identifier. The demand volume statistic (1170) provides a moving sum of the number of requests in the last K time intervals T. To assess whether demand for an object is high, the controller looks at the density and volume statistics. To this end, the controller looks for objects with high rate, high density, and preferably both high density and volume. Objects known to be in high demand are identified as such by the controller via the hot object Boolean field (1180). A YES in this field indicates that the object identifier is in high demand. Last, a timestamp (1190) is used to track the time of the last demand assessment. A skilled artisan will appreciate that assessments on measurements that are too old are to be avoided (preferably), as confidence on such assessment will be low. Preferably, the controller is not limited to tracking a dominating geography solely on an object identifier basis. For example, the dominating geography statistics may be tracked on a per replica basis. Such tracking enables the controller to efficiently detect whether a particular replica (associated with a given geography) ends up (in the long run) servicing requests from a different dominating geography. Consequently, a replica migration mechanism providing the ability to migrate a replica located on a server in some geographic partition onto a new global server where such server matches the dominating geography associated with past placements made to that replica may be used to correct such situation. The replica migration mechanism is described in greater detail hereinbelow and is implemented as part of the capacity shaping mechanism such as described in commonly-owned, co-pending U.S. patent application Ser. No. 09/335,273, entitled SYSTEM AND METHOD FOR CAPACITY SHAPING ON INTERNET ENVIRONMENT, the whole contents and disclosure of which is incorporated by reference as if fully set forth herein. Furthermore, a recent history of dominating geographies may be used to assess the stability of a shift in dominating geography associated with a given replica or object identifier.

The means employed for monitoring and estimating available system capacity are provided via the deployment and use of a resource monitoring subsystem. The resource monitoring system interfaces to servers through a resource management protocol which enables a server to report its available system capacity via a MON_STATUS message. Particularly, the MON_STATUS message relays a forecast of its future availability to the controller. This forecast is not binding, nor is it considered a contract by the controller. Instead, the forecast is considered to be an indication of the willingness of such server to consider future CID_QUERY messages described herein with respect to FIG. 7. In the preferred embodiment, the willingness of a server to consider new requests is a function of its available capacity as described below. For this reason, the controller refers to this as the utilization/willingness state of a server.

Figures 9A, 9B:
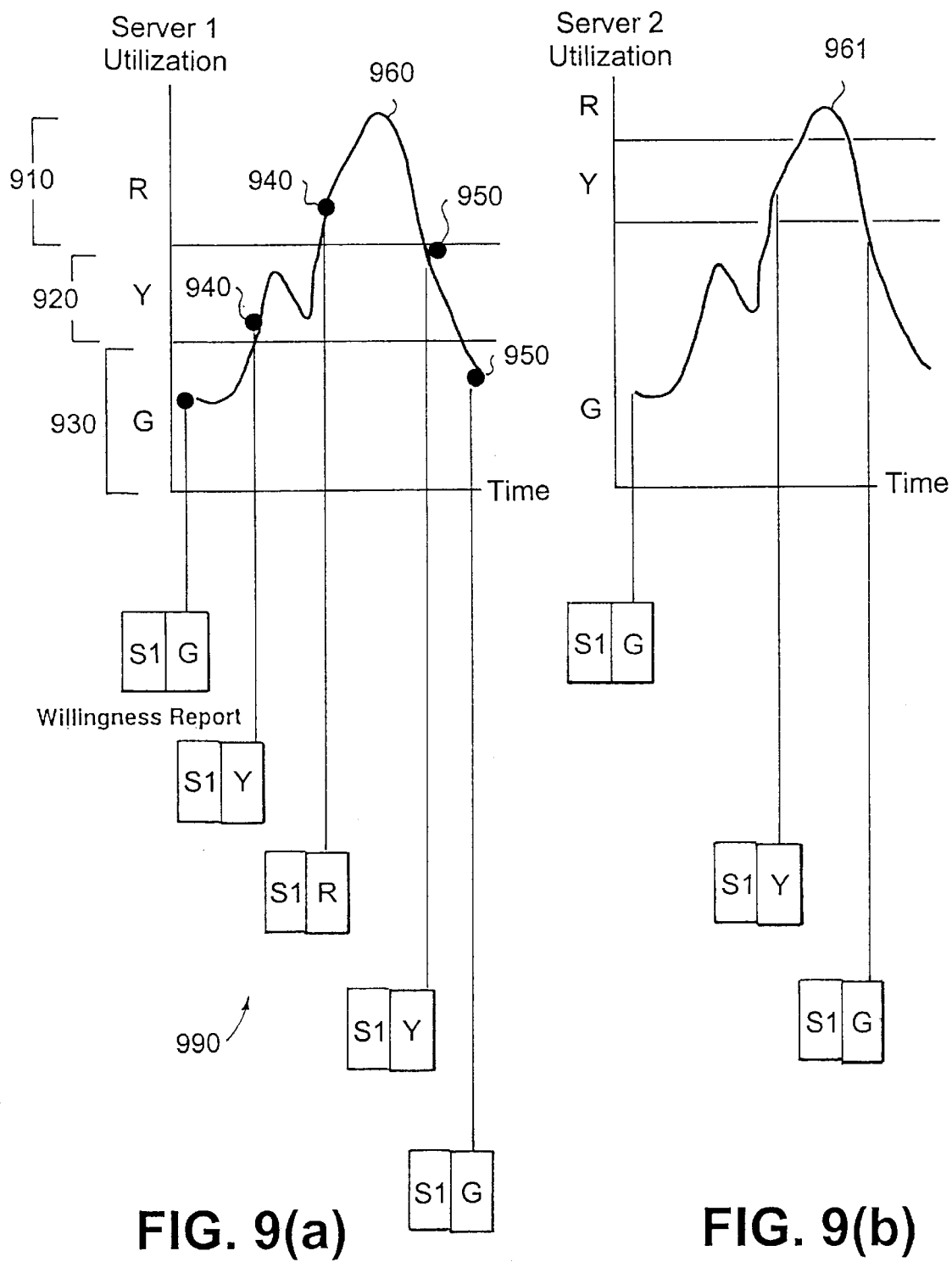
FIG. 9(a) illustrates a specific three color watermark strategy used by a server to associate its utilization state into a normalized willingness indicator that the controller can use across all servers.
FIG. 9(b) shows the application of the same watermark scheme by a different server.

FIGS. 9(a) and 9(b) illustrate, via an example, the particular watermark scheme (900) as prescribed by the preferred embodiment. The watermark scheme (900) is used by a server to map its utilization state into a normalized willingness indicator (990) that the controller may rely on across all servers.

Particularly, FIG. 9(a) depicts the utilization/willingness profile (960) of a particular server (e.g., Server 1) when subject to a utilization load. A RED condition (910) is used by a server to signal its controller that, currently, no more CID_QUERY messages will be considered by the server. A YELLOW condition (920) is used by a server to signal its controller that currently, no more CID_QUERY messages will be considered but that pending PLACE messages may be considered. Last, a GREEN condition (930) is used by a server to signal its controller that CID_QUERY messages will be considered. This flag is periodically updated by each server to indicate its current its utilization/willingness state. A server dispatches a MON_STATUS message to the controller only when it experiences a change on its willingness indicator. Although with three flags there are six conditions to consider, two conditions are considered important: 1) a change from GREEN to YELLOW/RED such as depicted at point (940); and, 2) a change from RED/YELLOW to GREEN (950).

FIG. 9(b) likewise depicts a different utilization/willingness profile (961) obtained from another server (Server 2) when subject to the same utilization as for Server 1. It should be noted that each server could independently set its RED, GREEN, and YELLOW watermarks to values that suit their individual willingness toward receiving CID_QUERY messages. In addition to the utilization/willingness state, a capacity rating is used to indicate whether the server is a HIGH capacity or a LOW capacity server. The capacity rating determination of a server may be made based on a straightforward threshold check in terms of the maximum number of concurrent streams that the server provides on its GREEN state. Heretofore, a GREEN replica is used to refer to as replica on a GREEN server. Similarly, a GREEN server is used to refer to a server for whom its last utilization/willingness state (990) was reported to be GREEN (930).

Referring back to FIG. 6, a resource monitoring/management protocol (671) permits a server to report its utilization/willingness state and its GREEN capacity rating to the controller. To report utilization/willingness and capacity to the controller, the server uses the MON_STATUS message which identifies the reporting server (e.g., via, its IP address or hostname), the controller, the time of the report at the server, the new utilization/willingness state, and a capacity rating (as will be hereinafter described).

A FIFO ordering transport mechanism such as TCP may be used between the servers and controller to ensure that messages are received in order. Each new MON_STATUS message overrides the last reported state for such corresponding server at the controller. However, if the capacity rating is left blank by the server, then no change is recorded by the controller for the capacity of such server. Moreover, if a MON_STATUS message is lost, the system recovers in the manner as follows: if the lost message indicated a change to RED (940) (FIG. 9(a)), then any subsequent placement (i.e., a CID_QUERY message) will not pass admission controls at the server. Such events are considered by the server as a violation of the placement agreements between controller(s) and servers. As a result, such RED server will, if necessary, re-issue a RED MON_STATUS message to the controller(s) in question in order to avoid receiving any further CID_QUERY placement messages.

A controller may request, if necessary, resource-monitoring state from a particular server. Via the MON_REQUEST message, the resource monitoring protocol also enables the controller to query the utilization/willingness state, and in addition, determine the true available GREEN capacity of any server when evaluated for the requirements of a particular object identifier. The ability to poll a particular server is useful to the controller when deciding whether to place a new replica of an object on a global server as accomplished by a replica placement process (1400) as described in greater detail hereinbelow.

According to the preferred embodiment of the invention, the purpose of the utilization/willingness indicator described with respect to FIG. 6(b) is twofold. First, from the viewpoint of the controller, the utilization/willingness indicator is used to address heterogeneity with respect to resource utilization measurements across servers. In particular, the preferred embodiment uses a three-color watermark as its utilization/willingness indicator which is server-independent. This scheme, in conjunction with the server's capacity rating, allows the controller to compare the relative utilization of different servers to processing future placement queries. As a result, the utilization/willingness of any server in the system is measured in terms of six (3×2=6) conditions resulting from three utilization states (GREEN, YELLOW, RED) and two capacity ratings (HIGH, LOW).

On the other hand, it should be noted that each server may independently set utilization/willingness indicator to suit its needs. In particular, a server could set its RED, GREEN, and YELLOW watermarks thresholds to values that suit their individual willingness as opposed to values that reflect particular utilization levels. Moreover, it is envisioned that such willingness values could change dynamically. Such changes would then represent behavioral changes on the response of a server to future demand. This second facet is referred to herein as the aggressiveness or willingness of a server toward acquiring placement queries. That is, from the viewpoint of the server, the utilization/willingness indicator scheme may be used by the administrator of such server to customize the aggressiveness or lack thereof of the server in pursuing placements from the controller. In other words, two servers with the same resources and identical physical location may observe very different placement inquiries depending on how aggressive their respective assigned utilization states are.

In particular, the administrator of a server may set the three utilization states (GREEN, YELLOW, RED) to threshold values that suit the service needs of that server's administration. For example, some servers could be interested in being perceived as highly reliable and with strong service guarantees. In such case, a server's administrator would customize the GREEN region to conservative values (e.g., low values such as 50% of true capacity thus providing to guarantee service at the expense of a 100% capacity over-engineering). On the other hand, other servers may like to be perceived as offering inexpensive services by trading quality of service such as occasional jitter or denials of service. In such case, a server's administrator would customize the GREEN region to aggressive values (e.g., high values such as 85% of the true capacity thus pushing YELLOW and RED regions to just a 15% slack). As a result, since YELLOW and RED regions represent resource slack used to accommodate replication requests and resource utilization randomness, decreasing this resource slack intrudes into the service guarantees made to accepted streaming connections in the GREEN area. However, such server would observe a larger number of placement inquiries from the controller. It is envisioned that such a server could then pick and choose among inquiries according to some greediness criteria such as revenue or demographics.

Figures 11B, 11C:
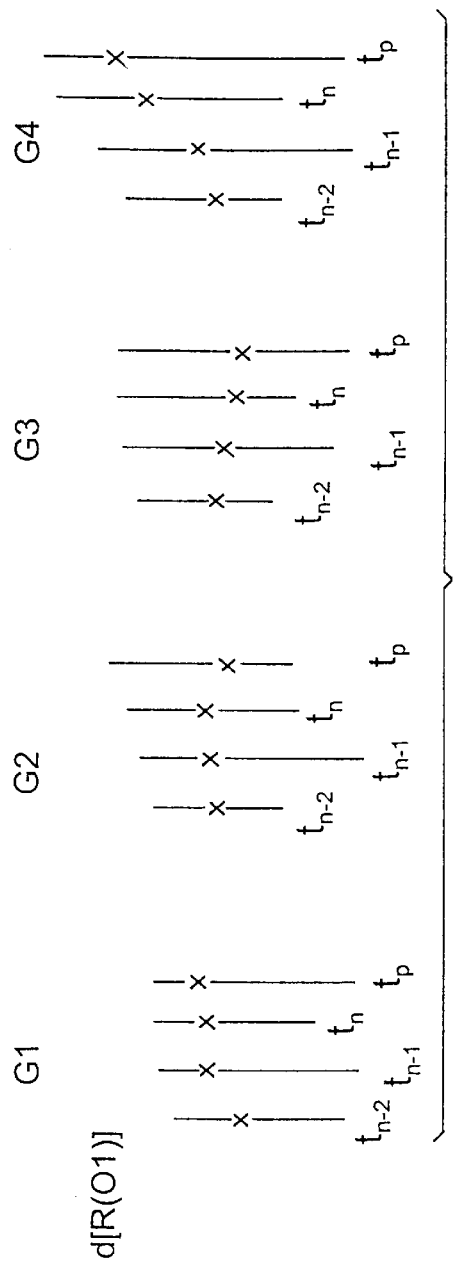
FIG. 11(b) illustrates via an example, a method used in the preferred embodiment to generate the geography density indicator for the request stream shown in FIG. 11(a).
FIG. 11(c) illustrates via an example the demand statistics stored by the controller corresponding to FIGS. 11(a) and 11(b).

The demand statistics and data structure (696) illustrated and described above with respect to FIG. 11(c), is used by the controller to track the reported capacity and utilization/willingness of its servers. As shown in FIG. 11(c), the demand statistics and data structure maintains statistics associated with requests for each object identifier including: the predicted demand "d," a demand volume statistic or rate "r," i.e., the request activity for the object replica per time interval, and an indication of whether the requested object is a "hot object" representing a summary of its activity. Optionally associated with an object ID is a dominating geography indicator "g" representing a dominating geographical area associated with object requests. Furthermore, a time-to-live timestamp is associated with each replica.

Once the timestamp expires, the global server currently owning the transient replica requests a renewal from its controller (i.e., the controller who placed this replica). At this point, the controller may either drop the replica by denying its renewal or renew it by extending its time-to-live (thus re-populating the database with this new replica). If the controller denies the renewal, then the transient replica may end up being deleted by its global server. A skilled artisan will appreciate that periodical checkpointing of these data structures is desirable for fault tolerance. It should be noted that, in case of a data loss, this data will be reconstructed by having the controller query each individual server via the MON_REQUEST message. For servers for whom a report can not be made available, the corresponding utilization/willingness state is defaulted to RED and its capacity rating left blank until a MON_STATUS message is received from that server. This approach increases the controller's fault tolerance to server failures at the expense of under-utilization of such a server since no new placements will be assigned to such a server until its utilization/willingness state becomes GREEN again.

Geographical Shaping of Capacity

As mentioned, object replicas are enabled to migrate across servers in response to forecasts about predicted demand and available capacity. Consequently, the invention provides a mechanism for regulating the placement of not only requests but, more importantly, replicas throughout the network. This replica management technique may be based on characteristics of predicted request demand and available capacity.

FIG. 8 illustrates via an example, the need for a distributed computer system capable of dynamically controlling the placement of replicas onto global servers based on some set criteria such as demand and geography as demonstrated in the preferred embodiment. In this example, there are four geographical partitions (G1, G2, G3, and G4)—roughly corresponding to the North East (G1), South East (G4), North West (G2), and South West (G3), respectively. A local server (830) is located in the G1 partition. A global server (840) is found in the G4 partition. The system comprises another two global servers (850, 860). The global server (850) provides coverage for the G2 partition whereas the global server (860) provides coverage for the G3 partition. The system comprises a collection of distributed objects. In this case, the collection consists of three different objects (O1, O2, O3). Each of these objects is associated with replicas which may be found throughout the system, i.e., in both global and local servers. In the present invention, replicas found in a local server are referred to as persistent replicas whereas replicas found in a global server are referred to as transient replicas. For each object in the distributed collection, zero or more transient replicas may exist throughout the system.

In the example depicted in FIG. 8, there are three persistent replicas, object O1 (820), object O2 (800), and object O3 (810). All these replicas are found in the G1 local server (820). On the other hand, object O1 has one transient replica (801) found on the G4 global server (840) whereas object O2 has two transient replicas (811, 812) found on the G4 (840) and G3 (860) global servers, respectively. Object O3 represents an object for which enough capacity is provided via its persistent replica (810) via the G1 local server. Consequently, no transient replicas of object O3 are (currently) found in the system. Moreover, in this example, object O2 represents an object predicted to be in high demand, i.e., a hot object. This example assumes that analysis of past history indicated that a significant number of requests for object O2 originated from the G3 geography partition meaning that object O2 has an associated "dominating geography." Based on the dominating geography and demand statistics associated with the object O2, the system determines that placing a replica on the G3 partition is desirable. Hence, a transient replica (812) of object O2 was temporarily placed on the G3 global server (860).

Transient replicas have a dynamic lifetime determined by the controller. The lifetime of a transient replica depends, for example, on the demand against available capacity associated with its corresponding object as well as on the expected session duration of its object. For example, an aggressive deadline of, 2 hours could be used for a typical 90 minutes movie for which 30 minutes are allotted for both user interactions as well as lingering time for a deadline renewals from the controller. Clearly, a less aggressive deadline could be used (e.g., a 24 hour deadline for a 90 minute movie). Such strategy may be used when an object is expected to be in demand for such time but its demand may not be sufficiently large to guarantee it to be hot for such duration of time. Furthermore, the aforementioned time-to-live deadline of a replica may be re-set every time a new request is placed onto a transient replica.

As shown in FIG. 8, transient replicas reside on global servers (840, 850, 860) which provide storage and streaming resources for the dynamic set of replicas such as (801, 811, 812) associated with a collection of objects such as (800, 810, 820). In this example, transient replicas (801, 811) for object O1 (800) are found on global server (840) whereas a transient replica (812) for object O2 (810) is found on global server (860) and no transient replicas exist for object O3 (820). Furthermore, in the example depicted in FIG. 8, a third global server (850) is shown to be available but without any transient replicas. The controller is enabled to manage the dynamic placement of replicas onto global servers in response to some set criteria such as cost, demand, and capacity.

FIG. 10 illustrates in further detail the modeling of any server (1000) found in FIG. 8 (such as server (830) or (840)). As stated before, a server provides both storage and/or streaming resources for these objects. However, the server (1000) is now divided into two independent partitions: a local partition (1010) and a global partition (1020). Both partitions provide independent storage and/or streaming resources for the objects on their collections (1011) and (1021). These collections (1011, 1021) are independently managed. However, whereas the local partition (1010) has a closed membership collection (1011), the global partition (1020) has an open membership collection (1021). As stated before, for a global partition, the membership is managed by the controller, whereas for a local partition, the membership is managed locally by the server. It should be understood that a server may be dedicated to only one partition (i.e., 100% to one and 0% to the other).

Figure 1:
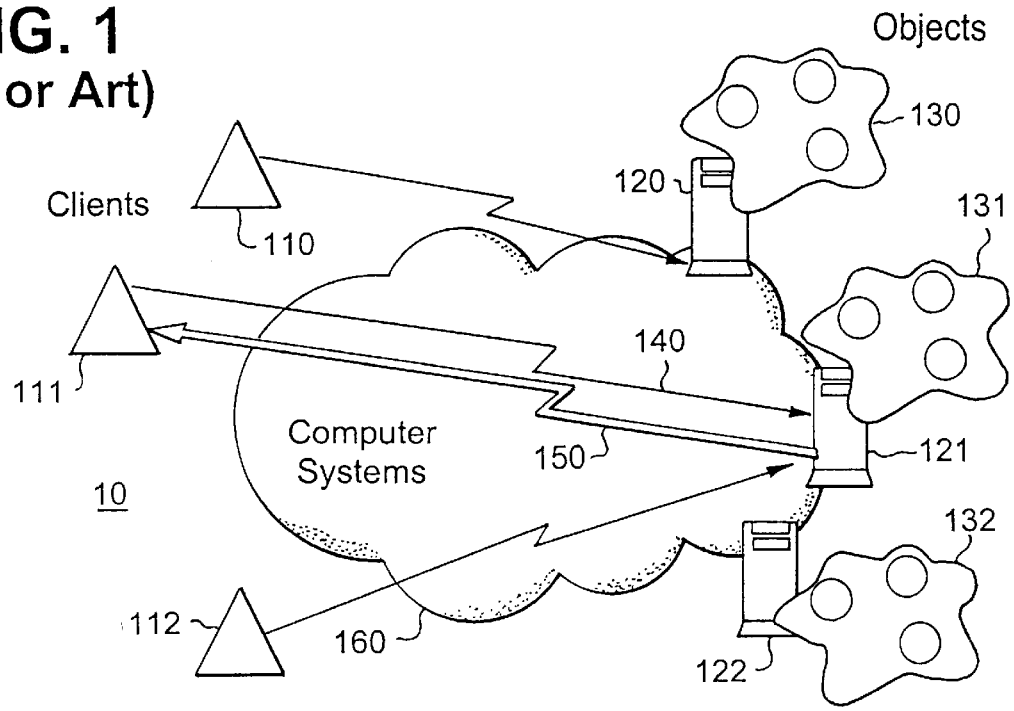
FIG. 1 illustrates a typical distributed computer system consisting of clients, servers, and objects stored in the server that may be requested for delivery to clients.
Figure 3:
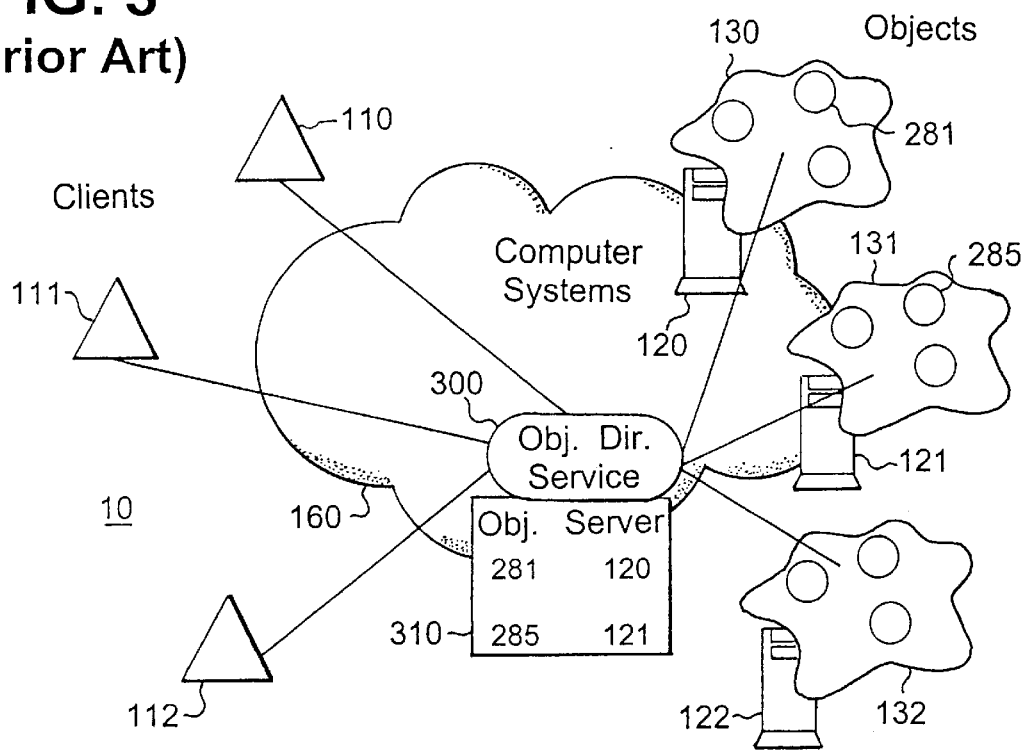
FIG. 3 illustrates a typical distributed object system including an Object Request Broker system enabling location and management of any object in the distributed collection.
Figure 2:
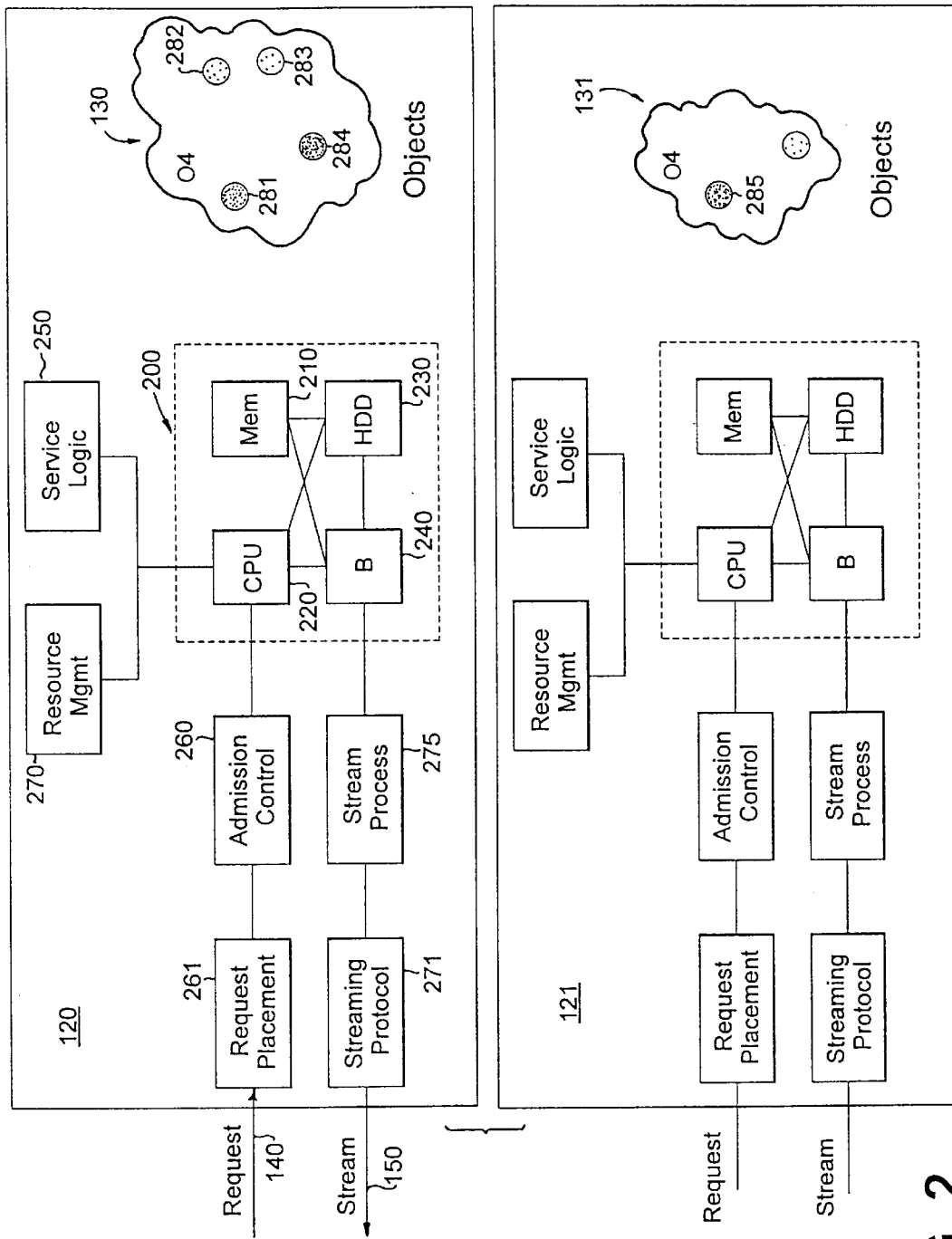
FIG. 2 depicts in further detail the components of the server devices found in the typical distributed computer system depicted in FIG. 1.

According to the preferred embodiment, a distributed system may comprise two separate types of servers: collections of (100%) local servers and collections of (100%) global serves. Thus, further to the embodiment of the server described herein with respect to FIG. 2, each partition (1010, 1020) in FIG. 10 comprises five software modules or processes, as now described.

The service logic (same as found in FIG. 2) provides application-oriented functions on the server. Examples of this application-oriented functionality are the billing and handling of client interactivity for any streaming session. The streaming process (275) provides the network streaming capability to deliver multimedia content from server to client. This functionality is typically performed in accordance to some standard protocol such as RTSP. An admission control process (1040) performs typical admission control tasks which are applied over queries from the controller. The admission control process (1040) evaluates a request and produces an admission offer to the controller (referred to as a candidate placement by the controller). The resource management process (1050) provides enhanced resource monitoring that enables the controller to determine aggregation oriented attributes about servers such as its utilization/willingness state of a server as well as its capacity. A resource management protocol (671) specifies the signaling (i.e., MON_STATUS, MON_REQUEST) used to monitor and query the state of a server. Last, the replication management process (1030) represents a new process added into the server to enable the creation and deletion of transient replicas on global servers. A replication management protocol described herein provides the signaling requirements that makes on-demand replication of objects possible. Each of the signaling interfaces (1031, 1041, 1051, 1061) enable a server to comply with the corresponding placement management, resource monitoring, streaming, and replica management processes on the controller. As described, the collection of objects on a global server has an open membership. Objects may enter the collection based, for example, on factors such as predicted demand for a particular object. Similarly, objects may leave the collection based, for example, on factors such as the relative utilization or revenue for a particular object when compared to other objects in the collection. Management of this dynamic membership may be autonomously controlled by controllers via a replica management signaling protocol which is used to replicate objects across servers as well as to migrate replicas across global servers. For example, a maximum number of transient replicas N may be implemented for any given object. This number may be determined a-priori or dynamically configured during run-time and each different object may have a different maximum number of transient replicas. Furthermore, the number of transient replicas associated with any given object will vary over time, e.g., may be autonomously increased when demand increases, the object is hot, or capacity is low, or, may be decreased when demand decreases, the object is no longer hot, or capacity is found to be sufficiently high for predicted demand.

With more particularity, the replica management system comprises four processes and a complementary signaling protocol (i.e., the replica management protocol) that operate to implement on-demand replication of objects. The replica management system is responsible for the regulation response of controllers over servers (i.e., the placement of replicas and/or requests) with such regulation response directed toward particular servers based on some set constraint accounting for attributes such as the resource capacity of servers. In particular, the placement of requests and replicas onto the same global server may be focused to satisfy explicit co-allocation constraints as set forth by clients and content authors, respectively.

In the present invention, the interaction between requests (i.e., demand) and replica (i.e., capacity) management systems consists of two demand-to-capacity (i.e., unidirectional) triggers referred to as preliminary scarcity and oversupply checks, respectively. On one hand, the preliminary scarcity check is used by the request management system to request an under capacity audit from the replica management system when demand for a particular object is predicted to increase. On the other hand, the preliminary scarcity check is used by the request management system to request an over capacity audit from the replica management system when demand for a particular object is predicted to decrease. If a preliminary test identifies a possible demand-to-capacity condition, a comprehensive analysis is requested from the replica management system, which could possibly lead, to the creation and/or deletion of replica(s). For this reason, these checks are referred to as preliminary, since their goal is to provide a balance between replica management overhead and aggressiveness.

The capacity shaping mechanism described in the co-pending related disclosure U.S. patent application Ser. No. 09/335,273 is to be activated on a number of conditions as described in the present invention. In particular, a preliminary check by the request management system is used to identify a possible scarcity condition (defined there as an undersupply in available capacity given predicted demand). This check is used to trigger the activation of the capacity shaping mechanism as described in the above-mentioned commonly-owned, copending U.S. patent application Ser. No. 09/335,273 and referred to as the replica management system. Similarly, in the present invention, a preliminary check is used to identify a possible oversupply condition (defined therein as an oversupply in available capacity given predicted demand). The check is used to trigger the activation of the capacity shaping mechanism as described in the related disclosure U.S. patent application Ser. No. 09/335,273.

The aforementioned integration of the replica management and request management systems (i.e., demand and capacity shaping) is now described in greater detail herein with respect to FIG. 12 which illustrates a high-level diagram depicting the interactions between the various processes of the replica management system as described below.

Figure 12:
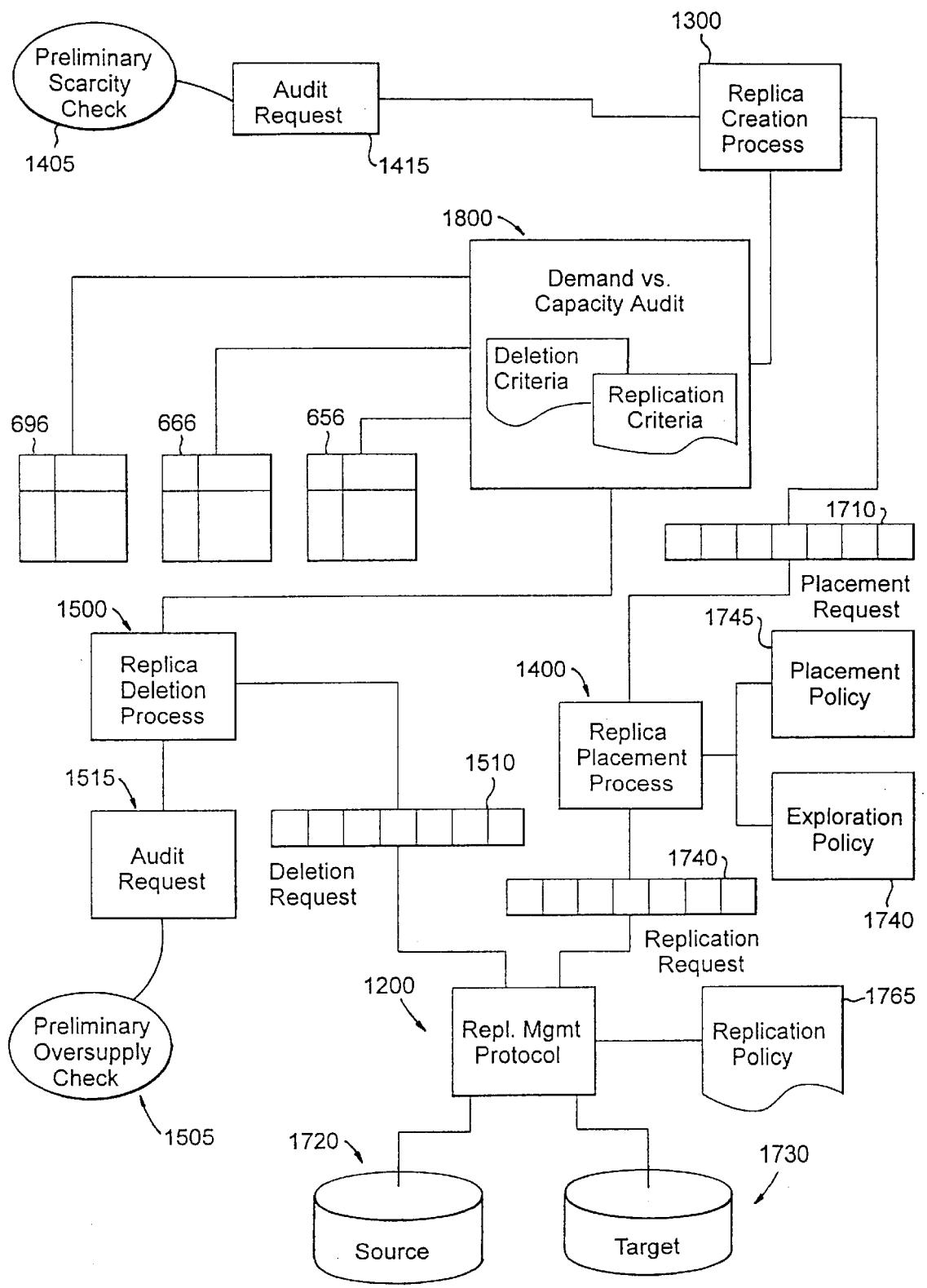
FIG. 12 depicts a high level diagram of the replica management process and its trigger-based interaction with the request management system.

As shown in FIG. 12, a preliminary scarcity check (1405) is first performed by the request management system to identify a possible scarcity condition. The preliminary scarcity audits check (1405) takes place after the establishment of a service binding on the request management system. The preliminary scarcity check (1405) as used in the preferred embodiment is depicted in further detail in FIG. 13(b).

Figure 13A:
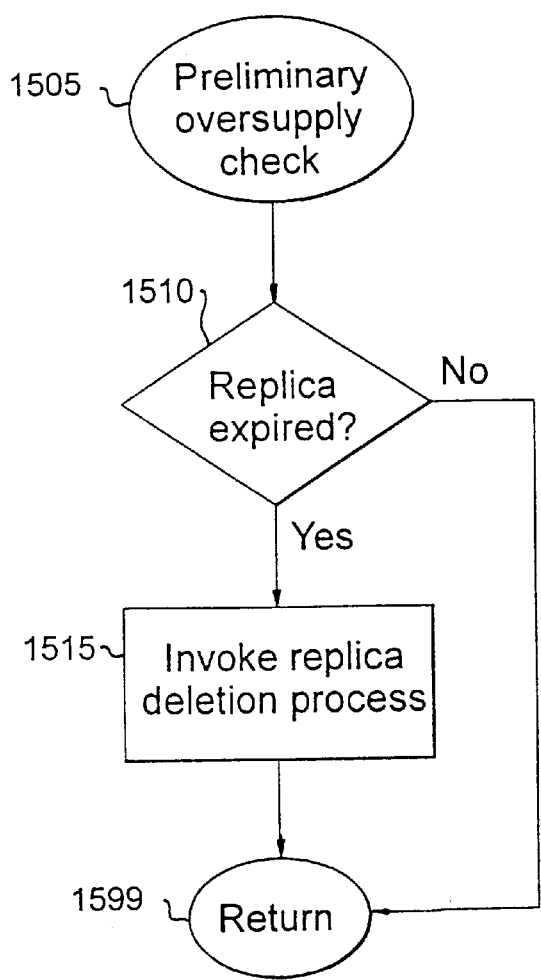
FIG. 13(a) is a flow chart depicting the preliminary oversupply check implemented by the request management system to activate the capacity shaping mechanism (i.e., the replica management system).
Figure 13B:
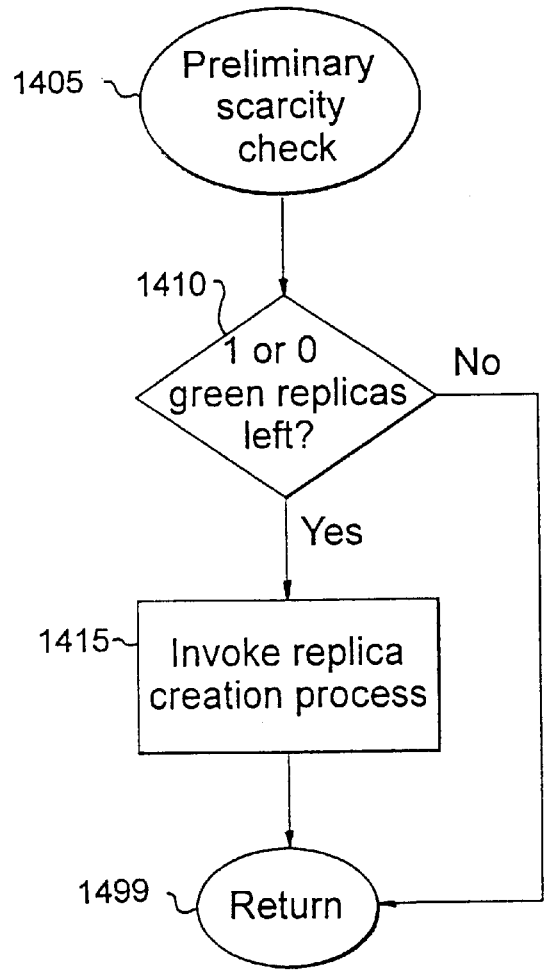
FIG. 13(b) is a flow chart depicting the preliminary scarcity check implemented by the request management system to activate the capacity shaping mechanism.

In the preferred embodiment, as depicted in the flow diagram of FIG. 13(b), the preliminary scarcity check (1405) determines if less than two GREEN replicas of the requested object are left (1410). When a possible scarcity condition is identified, an audit request (1415) is raised to the replica creation process (1300). The audit request (1415) identifies the object (e.g., 420) in question. Its goal is to request a more comprehensive evaluation from the replica creation process (1300) for the specified object. The replica creation process (1300) is run only when such an audit request (1415) is raised, otherwise, no audit is triggered (1499). The creation of a replica causes a corresponding update of the replica directory (656) (FIG. 6(b).

Referring back to FIG. 12, if need for a new replica is found, a placement request (1710) is queued to the replica placement process (1400). The placement request (1710) indicates that the specified object (e.g., O1) has met the replication criteria and that a replica ought to be made. In particular, the replication process enforces a demand vs. capacity assessment. In the preferred embodiment, this assessment relies on controller-based data structures such as the demand statistics (696), the replica directory (656), and the server directory (666).

The goal of the replica placement process (1400) is to identify, based on some set criteria, a source server (see 1720) and target server (1730). In the preferred embodiment, the controller explores and negotiates replication options in a manner as described in related co-pending disclosure Ser. No. 09/335,273. Once source (1720) and target (1730) servers are identified, the replica management protocol (1400) queues a replication request (1740) for the corresponding placement request (1710). A replication policy (1455) allows the customization of exception handling under the replica management process as described in related co-pending disclosure Ser. No. 09/335,273.

As further depicted in FIG. 12, a preliminary oversupply check (1505) is used by the request management system to identify a possible oversupply condition. The preliminary oversupply audits check (1505) takes place during the termination of a service binding. Moreover, it is also applied whenever a server requests a renewal of a transient replica. When a possible oversupply condition is identified, an audit request (1515) is raised to the replica deletion process (1500).

The goal of the replica deletion process (1500) is to determine whether a particular replica needs to be deleted or not. Intuitively, a replica ought to be deleted when too many replicas had been created. In the preferred embodiment, a transient replica is considered a candidate for deletion based on criteria accounting for the objects time-to-live deadline, the demand vs. capacity associated with the object, and whether the object is hot or not. The global demand vs. capacity criteria (1800) (performed on a per-object basis) is used to determine whether predicted demand for an object is found to be significantly less than the overall available capacity (throughout the system) for such object. In the preferred embodiment, predicted demand is forecasted in terms of request density and request volume as described herein. Request density is a measure of the number of requests per some time interval where such time interval is a system parameter. Request volume is a measure of the total number of requests over some number of past time intervals where such number is also a system parameter. Similarly, available capacity is indirectly estimated by determining the number of available GREEN servers containing replicas of the object. Since the system associates a capacity rating to each server, an upper-bound capacity estimate is derived in terms of the number of potential streams that can be served. A reader versed in the arts would appreciate that this estimate is optimistic in nature but rather efficient to compute as it does not require the exchange of messages with servers in the system.

It is noted that, in the present invention, requests placed during the replication may be: deferred (in time); handed-off (to another controller); or simply refused by the controller depending on some set criteria.

A skilled artisan will appreciate that during this time, it is possible for the reported utilization/willingness state of servers to change. On one hand, it is possible that while a transient replica is being created (1470), one or more servers become available (i.e., GREEN) causing capacity to exceed demand. In this case, the time-to-live of the newly created replica then will determine the duration of the oversupply. That is, as mentioned, the replication mechanism assigns an expiration deadline to every replica it creates. When the expiration deadline for a replica expires, its global server requests a renewal of the replica's expiration deadline. If this effort is unsuccessful, the replica may be deleted from the global server causing its resources to become available. On the other hand, it is also possible that by the time that the new replica becomes available, no available capacity is left (i.e., no GREEN servers are found) causing demand to significantly exceed capacity. In such case, the placements made during scarcity would trigger additional replica creation audits. For this reason, it is necessary to limit the maximum number of replicas to be created for any particular object. A skilled artisan will appreciate that the new audit requests may be queued for a pre-determined amount of time. Then, after such time, the preliminary scarcity condition is re-checked to determine if it is persistent (i.e., during the queuing time no GREEN replicas became available). Clearly, if this amount of time were too long, then requests for this object would be in the meanwhile drop or hand-off to another controller.

It should be noted that the creation of the new transient replica does not reserve resources at a global server. Instead, on-demand replication is used to increase the likelihood of finding available capacity during subsequent requests for the same object.

The replica management system trims capacity during sustained and significant decrease in demand for an object. In the present invention, the replica management system autonomously determines whether a replica ought to be deleted.

In the present invention, oversupply checks are intended to determine if, for a particular object, available capacity significantly exceeds predicted demand. In particular, the preferred embodiment recognizes various symptoms of oversupply such as, but not limited to: low utilization across one or more replicas; the existence of replicas for objects found not to be hot; and the expiration of a replica's time to live deadline.

The preliminary oversupply check (1505) implemented in the preferred embodiment, is now shown in FIG. 16(a). A transient replica is audited for deletion if its time-to-live deadline is found expired. In such case, the replica deletion process (1500) is invoked (1515) to perform a more comprehensive analysis. Otherwise, no action is taken (1599).

A skilled artisan will appreciate that other mechanisms may be used to shape capacity in a different way as opposed to one replica at a time. In particular, the shaping of capacity represents an adaptive rate control problem, and, as such, current best practices suggest the use of an asymmetrical compensation strategy. For example, a multiplicative increase (e.g., first time create one replica, second time create two replicas, third time create four replicas, and so on) coupled with a linear decrease (e.g., first time delete one replica, second time delete one replica, and so on) could be used. It is also possible to match the compensation effort (i.e., the number of replicas to create) to the increase in demand. In such an approach, the number of replicas to create is determined based on the difference between past and forecast demand such as described in Manohar, N, et al, "Applying Statistical Process Control to the Adaptive Rate Control Problem", Proc of SPIE MMCN '98, January 1998. Regardless, it is clear that a bound on the maximum number of replicas is desirable so as to bound the replication effort.

There are many useful applications of the present invention. For example, as mentioned, the system and method of the present invention may be used as a value-added service by a Internet Service Provider (ISP) supporting a broadcast content providers such as a cable television network, for illustrative purposes, to dynamically match demand to capacity of that cable network's servers. When necessary, the ISP places transient replicas (of the cable network content) on its own global servers based on characteristics about the demand for that content as presented to the ISP. Several such variations are discussed herewith.

For example, the present invention could be used as well to provide statistical sharing of ISP resources (i.e., globally-shared servers) when supporting multiple broadcast content providers. This way, the ISP controller would then manage the allocation of replication requests according to some cost metric such as profit or content provider maximum loss protecting most likely, the best interest of the ISP.

In an implementation of particular interest, each independent content provider runs a server referred to as a delegate controller behind its firewall. The delegate controller performs demand and capacity monitoring tasks for the content provider and when critical thresholds are exceeded, the delegate controller places a replication request to the ISP's controller. The ISP controller then arbitrates between pending replication requests and determines which replication requests get allocated to which global servers. In particular, the same global server could be shared across different delegate controllers.

A skilled artisan may appreciate that content providers, for security reasons, may not be willing to disclose nor allow another party to access its internal usage statistics. For this reason, it is envisioned that content providers should be allowed to directly request the placement of a specific replica onto the ISP global servers. Furthermore, such request may be conditioned (by the content provider as opposed by the controller) to meet particular requirements such as geography or capacity of the target global server. The ISP controller would then try to locate one such particular global server satisfying such requirements. For example, a particular content provider could place a replication request such as "get me a replica of the following content within the next 5 minutes and locate such transient replica in a HIGH capacity server in the Southeast of the USA".

Moreover, ISPs may collaborate in agreements that allow an ISP to handoff replication requests to other ISPs having suitable global servers. For example, in the event that none of an ISP's global servers satisfies the requirements associated with a request placed by a content provider, the ISP would then handoff the replication request to some such friendly ISP.

Moreover, an auction for the placement of such replication requests could be implemented by an intermediary party. Such intermediary party would then negotiate the handoff for such replication request to the most capable or suitable party according to some cost metric such as cost or an expiration deadline.

A skilled artisan will appreciate that it is possible for a replica to be placed in a global server, which no longer fits demand characteristics. To this end, the present invention augments the replica management system described in related disclosure Ser. No. 09/335,273 by performing periodical sanity checks. The present invention however, implements a replica migration mechanism as described in the aforementioned related disclosure Ser. No. 09/335,273, for reviewing and enhancing the overall placement of transient replicas on the system. The goal of replica migration is to stabilize the placement and movements of replicas throughout the distributed system. The replica migration process performs periodical sanity checks responsible for the stability and fine-tuning the distribution of transient replicas throughout the overall system. The replica migration process performs garbage collection and optimization over the placement and number of transient replicas. The replica migration process is invoked in a manner similar to a garbage collection process. The replica migration process walks through the list of all transient replicas and finds those having low utilization.

The replica migration process may not determine whether it is efficient (based on some cost criteria) to migrate a replica across geography partitions, e.g., the case when the dominating geography of a hot object changes (as for example, when the requests from clients shift from the East Coast to the West Coast). However, replica migration may be used to reduce network costs due to increasing geographic proximity to predicted demand. For example, the movement of an already placed transient replica from one global server onto another may be desirable if overall system capacity is low and analysis of predicted demand identifies a shift in the characteristics of future demand. In particular, whereas past demand may have caused the placement of a transient replica on geography partition G1, predicted demand from geography partition G3 may make it desirable to migrate the transient replica from G1 to G3 (See, FIG. 8). Thus, the migration of a replica onto a different global server is then triggered based on a cost metric forecasting a predicted cost benefit when comparing current placement to recommended placement.

The replica migration process relies on various heuristics, such as, for example: transient replicas might be moved from one global server onto another, based on some set criteria. Furthermore, two transient replicas at different global servers may be collapsed (merged) into a replica at a single global server. For instance, it may sometimes be useful to merge two or more transient replicas so as to project their combined placement characteristics (e.g., usage and demographics) onto another server. Furthermore, such decision may be based on some set criteria such as suitability of the global server to demand demographics. For this reason, the present invention refers to replica merging as an additive projection of replica placements.

It may additionally be desirable migrate replicas (transient or not) onto another replica (transient or not), i.e., offload placements from a replica on one server onto another server. For example, this would be desirable so as to open capacity on a particular global server or to collapse sparse usage of transient replicas across multiple servers onto a persistent replica with low utilization.

It should be further understood that replica migration measures require carefully trigger controls with respect to past placement goals in order to avoid instability on the demographics of replicas. A skilled artisan will appreciate that techniques such as online process optimization and neural networks may be used, in addition to or in lieu of the aforementioned techniques, to implement self-regulated controls and to evaluate and control the robustness of the aforementioned migration heuristics.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A request management system for placing requests for multi-media objects from independent clients onto servers distributed throughout a network having said objects, each server having a capacity for storing multi-media objects and, a streaming resource for delivering requested multi-media objects to clients, the system comprising:

intermediary control means for receiving placement inquires for said multi-media objects from said clients, a requested object having a unique identifier associated therewith;

first directory service means comprising a mapping of object identifiers to locations of associated object replicas at said servers, said first directory means for locating object replicas associated with the given object identifier;

second directory service means for mapping available distributed servers with an indicator indicating degree of willingness of a respective server to receive placement inquiries and, determining a willingness of any such server to consider said placement inquiries for said object replicas; and, means for generating one or more placement inquiries to a willing server according to a predetermined policy, said intermediary control means forwarding a placement inquiry to said willing server.

2. The system according to claim 1, wherein said willingness indicator of said directory service represents a degree of server aggressiveness for functioning in said distributed network, said indicator being used to drive aggressiveness of said servers.

3. The system according to claim 1, wherein a server in said distributed network includes a server cluster comprising one or more server devices addressable as a single entity.

4. The system according to claim 1, wherein said second directory service enables mapping of distributed servers with an available capacity rating indicator for indicating amount of resources available at said server.

5. The system according to claim 4, wherein said control means implements a placement policy for generating one or more tentative placements of requests to servers, said control means accessing said first and second directory services for determining said tentative placements.

6. The system according to claim 5, wherein said predetermined policy includes a negotiation policy, said control means further choosing one or more tentative placements and negotiating with each associated server to enable placement of a particular request to that server based upon a predetermined criteria.

7. The system according to claim 6, wherein said predetermined criteria includes one or more selected from a group comprising: resolution of a streaming object, cost, quality of a streaming object, distance between a client and server, and maximum delay for receiving a streaming object.

8. The system according to claim 7, wherein each said server applies its own admission control for admitting or denying placement requests, and communicating an admission or denial of a placement request to said intermediary controller.

9. The system according to claim 6, wherein said control means further implements an exploration policy for iteratively determining multiple placement opportunities across one or more servers.

10. The system according to claim 6, wherein said control means further includes means for monitoring a number of received requests and aggregating said requests into groups of requests based on one or more predetermined characteristics.

11. The system according to claim 10, wherein demand requests for objects received during a bounded time interval are aggregated.

12. The system according to claim 11, wherein a predetermined criteria for aggregating demand requests during a bounded time interval includes geographic proximity of clients requesting the same object identifier.

13. The system according to claim 11, wherein a predetermined criteria for aggregating demand requests during a bounded time interval includes commonality of requested streaming constraints including resolution and quality for the same object identifier.

14. The system according to claim 12, wherein a predetermined criteria for aggregating demand requests during a bounded time interval includes temporal proximity in arrival time of requests for the same object identifier.

15. The system according to claim 14, wherein said controller means further includes means for batching a group of similar requests to a server with multicast capability, said server providing multicast services for clients.

16. The system according to claim 14, wherein said control means further includes means for autonomously upgrading or downgrading a particular request in order to achieve aggregation.

17. The system according to claim 16, wherein said means for upgrading or downgrading a particular object request includes decreasing or increasing, respectively, said sensitivity of geographical proximity grouping criteria.

18. The system according to claim 16, wherein said means for upgrading or downgrading a particular object request includes increasing or decreasing, respectively, quality of the requested object.

19. The system according to claim 16, wherein said means for upgrading or downgrading a particular object request includes changing sensitivity of temporal proximity grouping criteria.

20. The system according to claim 10, wherein each said server reports its available system capacity to said controller means.

21. The system according to claim 10, wherein said control means further includes means for generating object replicas and dynamically controlling placement of object replicas on servers according to current demand requests for said objects.

22. The system according to claim 21, further including means for forecasting future demand for object requests based on past demand for said object, said placement of object replicas being based on forecasted demand.

23. A method for shaping demand for multi-media objects stored at one or more servers distributed throughout a network, each server device having a capacity for storing multi-media objects and, a streaming resource for delivering requested multi-media objects to clients, the method comprising:

receiving requests for said multi-media objects from independent clients, each requested object having a unique identifier associated therewith;

maintaining a mapping of object identifiers to locations of associated object replicas at said servers and utilizing said mapping to locate object replicas associated with the requested object identifier;

maintaining a mapping of available distributed servers with an indicator indicating degree of willingness of a respective server to receive placement inquiries, and utilizing said mapping to determine a willingness of any such server to consider a placement inquiry associated with said request for said object replicas; and, generating one or more placement inquiries for said object to a willing server according to a predetermined policy, and forwarding a placement inquiry to said willing server.

24. The method according to claim 23, wherein the step of determining the willingness of servers includes implementing a directory service for mapping distributed servers with an available capacity rating indicator for indicating amount of resources available at said server.

25. The method as claimed in claim 23, further comprising the step of maintaining demand statistics associated with each distributed object, said demand statistic including a characterization of demand density, demand volume and including a geographic indicator for indicating dominating area of demand.

26. The method according to claim 25, further including the step of generating one or more tentative placements of requests to servers based on locations of said object identifiers and a capacity rating for said servers.

27. The method according to claim 26, wherein said predetermined policy includes a negotiation policy, said generating step including choosing one or more tentative placements and negotiating with each associated server to enable placement of a particular request to that server based upon a predetermined criteria.

28. The method according to claim 27, wherein said predetermined criteria includes one or more selected from a group comprising: resolution of a streaming object, cost, quality of a streaming object, distance between a client and server, and maximum delay for receiving a streaming object.

29. The method according to claim 27, wherein each said server applies its own admission control for admitting or denying placement requests, and communicating an admission or denial of a placement request to said intermediary controller.

30. The method according to claim 27, further implementing an exploration policy for iteratively determining multiple placement opportunities across one or more servers.

31. The method according to claim 27, further including the step of monitoring a number of received requests and aggregating said requests into groups of requests based on one or more predetermined characteristics.

32. The method according to claim 31, wherein demand requests for objects received during a bounded time interval are aggregated.

33. The method according to claim 31, wherein a predetermined criteria for aggregating demand requests during a bounded time interval includes geographic proximity of clients requesting the same object identifier.

34. The method according to claim 31, wherein a predetermined criteria for aggregating demand requests during a bounded time interval includes commonality of requested streaming constraints including resolution and quality for the same object identifier.

35. The method according to claim 31, wherein a predetermined criteria for aggregating demand requests during a bounded time interval includes temporal proximity in the arrival time of requests for the same object identifier.

36. The method according to claim 31, further including the step of autonomously upgrading or downgrading a particular request in order to achieve aggregation.

37. Integrated system for real-time management of multimedia object resources in an Internet environment having servers for storing and providing streaming of multimedia objects to clients, the system comprising:

means for monitoring demand for object resources and for predicting future demand for objects based on demand statistics and geographical location of said demand;

means for ascertaining current willingness of server devices to store and allocate resources for streaming object resources in said Internet environment;

means for shaping capacity of object resources in said Internet environment based on said demand statistics, said current available capacity and said geographical proximity of servers to demand locations, said capacity shaping means including means for replicating objects associated with said objects resources and temporarily placing said object replicas at one or more server devices having available capacity at predicted geographical demand locations;

means for placing received request inputs for an object resource from a client and, generating and forwarding placement inquiries related to one or more received requests to a server device having said requested object resource at said geographical location; and, means for negotiating with a server device to enable placement of a particular request to that server device based upon predetermined criteria associated with streaming of said object resource from said server device to said client.

38. The integrated system as claimed in claim 37, wherein said means for shaping capacity includes means for evaluating a number and geographical placement of object replicas based on characteristics associated with said demand.

39. The integrated system as claimed in claim 37, wherein said means for placing received request inputs includes means for querying, according to some policy, willing and capable servers for admission of one or more requests.

40. A program storage device readable by a machine, tangibly embodying a program of instructions executable by the machine to perform method steps for managing a demand for multi-media objects stored at one or more servers distributed throughout a network, each server device having a capacity for storing multi-media objects and a streaming resource for delivering requested multi-media objects to clients, said method steps comprising:

receiving requests for said multi-media objects from independent clients, each requested object having a unique identifier associated therewith;

maintaining a mapping of object identifiers to locations of associated object replicas at said servers and utilizing said mapping to locate object replicas associated with the requested object identifier;

maintaining a mapping of available distributed servers with an indicator indicating degree of willingness of a respective server to receive placement inquiries, and utilizing said mapping to determine a willingness of any such server to consider a placement inquiry associated with said request for said object replicas; and, generating one or more placement inquiries for said object to a willing server according to a predetermined policy, and forwarding a placement inquiry to said willing server.

41. The program storage device readable by a machine according to claim 40, wherein said step of determining the willingness of servers further includes implementing a directory service for mapping distributed servers with an available capacity rating indicator for indicating amount of resources available at said server.

42. The program storage device readable by a machine according to claim 40, further comprising the step of maintaining demand statistics associated with each distributed object, said demand statistic including a characterization of demand density, demand volume and including a geographic indicator for indicating dominating area of demand.

43. The program storage device readable by a machine according to claim 40, further including the step of generating one or more tentative placements of requests to servers based on locations of said object identifiers and a capacity rating for said servers.

44. The program storage device readable by a machine according to claim 43, wherein said predetermined policy includes a negotiation policy, said generating step including choosing one or more tentative placements and negotiating with each associated server to enable placement of a particular request to that server based upon a predetermined criteria.

* * * * *